(12) United States Patent
Petrucelli

(10) Patent No.: US 7,667,583 B2
(45) Date of Patent: Feb. 23, 2010

(54) TIRE PRESSURE GAUGE

(75) Inventor: Steven Petrucelli, Cranbury, NJ (US)

(73) Assignee: Measurement Ltd., Grand Cayman Islands (VG)

( * ) Notice: Subject to any disclaimer, the term of this patent is extended or adjusted under 35 U.S.C. 154(b) by 285 days.

(21) Appl. No.: 11/589,329

(22) Filed: Oct. 27, 2006

(65) Prior Publication Data

US 2007/0193349 A1 Aug. 23, 2007

Related U.S. Application Data

(60) Provisional application No. 60/772,703, filed on Feb. 13, 2006, provisional application No. 60/853,673, filed on Oct. 23, 2006.

(51) Int. Cl.
 *B60C 23/02* (2006.01)
(52) U.S. Cl. ............... 340/442; 340/445; 340/447; 73/146.8
(58) Field of Classification Search ......... 340/441–448, 340/539.1; 73/146.5, 146.6, 116, 146.8; 116/34 R, 34 A, 34 B
 See application file for complete search history.

(56) References Cited

U.S. PATENT DOCUMENTS

| | | | |
|---|---|---|---|
| 4,059,823 A | 11/1977 | Martin et al. | |
| 4,704,901 A | 11/1987 | Rocco et al. | |
| 4,748,845 A | 6/1988 | Rocco et al. | |
| 5,083,457 A * | 1/1992 | Schultz | 73/146.5 |
| D366,845 S | 2/1996 | Handfield et al. | |
| 5,774,048 A * | 6/1998 | Achterholt | 340/447 |
| 5,926,087 A * | 7/1999 | Busch et al. | 340/438 |
| 5,929,330 A | 7/1999 | Ford | |
| D419,085 S | 1/2000 | Prus | |
| 6,119,714 A | 9/2000 | Otzen | |
| 6,124,785 A * | 9/2000 | Huang | 340/442 |
| 6,374,666 B1 | 4/2002 | Lemberger et al. | |
| 6,463,798 B2 * | 10/2002 | Niekerk et al. | 73/146.2 |
| 6,507,276 B1 * | 1/2003 | Young et al. | 340/447 |
| 6,531,960 B1 | 3/2003 | Gladstone et al. | |
| 6,588,264 B1 | 7/2003 | Johnson | |
| 6,690,271 B2 | 2/2004 | Fischer et al. | |
| 6,707,390 B2 | 3/2004 | Hirohama et al. | |
| 6,710,708 B2 | 3/2004 | McClelland et al. | |
| 6,720,869 B2 | 4/2004 | Watanabe et al. | |
| 6,765,482 B2 | 7/2004 | Yamagiwa et al. | |
| 6,782,740 B2 | 8/2004 | Wallach | |
| 6,817,235 B2 | 11/2004 | Sapir | |
| 6,826,508 B2 | 11/2004 | Fujioka | |
| 6,838,983 B1 * | 1/2005 | Wong | 340/442 |

(Continued)

*Primary Examiner*—Anh V La
(74) *Attorney, Agent, or Firm*—Howard IP Law Group, PC

(57) ABSTRACT

A tire pressure gauge for attachment to a valve stem includes a wall defining a chamber having a first port adapted to sealingly engage a valve stem, a probe being mounted in the first port so as to open a valve of a valve stem sealingly engaged by the first port, a pressure sensor in the chamber, a memory, a display physically supported on the device, a processor being operatively coupled to said display, pressure sensor and memory; and code being stored in the memory and operable by the processor to: retrieve at least one value indicative of a first threshold tire pressure from the memory, determine a pressure sensed by the pressure sensor, and, cause the display to present information indicative of a relative value of the sensed value to the first threshold tire pressure.

25 Claims, 29 Drawing Sheets

U.S. PATENT DOCUMENTS

| | | |
|---|---|---|
| 6,856,245 B2 | 2/2005 | Smith et al. |
| 6,885,293 B2 | 4/2005 | Okumura |
| 6,906,624 B2 | 6/2005 | McClelland et al. |
| 6,911,903 B2 | 6/2005 | Gladstone et al. |
| 6,914,523 B2 | 7/2005 | Munch et al. |
| 6,918,291 B2 | 7/2005 | Durr et al. |
| 6,922,142 B2 | 7/2005 | Norimatsu |
| 6,946,954 B2 | 9/2005 | Piech et al. |
| 6,983,209 B2 | 1/2006 | Jaynes |
| 6,997,048 B2 | 2/2006 | Komatsu et al. |
| 7,009,505 B2 | 3/2006 | Huang |
| 7,013,722 B2 | 3/2006 | Little et al. |
| 7,040,152 B2 | 5/2006 | Rutherford |
| 7,075,417 B2 | 7/2006 | Harada et al. |
| 7,100,435 B2 | 9/2006 | Fujioka |
| 7,250,852 B1 * | 7/2007 | Kell .......................... 340/447 |
| 2005/0138999 A1 * | 6/2005 | Petrucelli ..................... 73/146 |

* cited by examiner

TO FIG. 19B

TIRE PRESSURE GAUGE

RELATED APPLICATIONS

This application claims the benefit of U.S. Provisional Patent Application No. 60/772,703, filed Feb. 13, 2006, and U.S. Provisional Patent Application No. 60/853,673, filed Oct. 23, 2006, which applications are incorporated herein by reference in their entireties.

FIELD OF THE INVENTION

The present invention relates to pressure measurement and pressure gauges.

BACKGROUND OF THE INVENTION

Pressure gauges are conventionally used for measuring the pressure of a gas or a liquid, such as an air pressure. Tire pressure gauges, as an example, measure the inflation pressures of vehicle tires, such information being useful for maintaining optimal tire performance and avoiding unnecessary wear. Conventional tire pressure gauges are held in the hand, and require the user to locate a tire valve, unscrew a cap from the valve, and engage the tire pressure gauge with the valve. At night, it is difficult to locate the valve. Tire valve caps are usually covered in a film of dirt, which comes off on the user's fingers when removing and replacing the cap. While some vehicles have systems for monitoring of tire pressure using tire pressure gauges with radiofrequency transmitters installed in the tires, and systems for interrogating the gauges and receiving readings installed in the vehicle, such systems are not practical to install on existing tires and vehicles.

Mechanical devices have been developed which connect to a tire valve stem, have a spring which is urged dependent on pressure in the tire, and a mechanical device, such as a ball, which is moved by the spring. Thus, tire pressure is displayed. Such devices are disclosed in, for example, U.S. Pat. No. 5,929,330 (Ford), U.S. Pat. No. 6,911,903 (Gladstone, et al.), U.S. Pat. No. 6,374,666 (Lemberger, et al.), U.S. Pat. No. 6,531,960 (Gladstone, et al.), and U.S. Pat. No. 6,588,264 (Johnson). These devices suffer from disadvantages, such as the difficulty of seeing them at night, and, when compared with modern tire pressure gauges, the relative lack of accuracy compared to pressure sensor dies.

It would be desirable for a tire pressure gauge to be easy to install on a vehicle, possible to see at night or other dark conditions, and not require physically engaging a device with a tire valve stem each time the pressure is to be read.

SUMMARY OF THE INVENTION

In one embodiment, a tire pressure gauge has a port adapted to couple to a vehicle tire valve stem and to open a valve in the valve stem; a chamber in physical communication with the port; a pressure transducer in the chamber for detecting a pressure of a fluid within the vehicle tire and providing an output signal representative of the detected pressure; a processor physically coupled to the pressure transducer for receiving the output signal, and for providing a processor output signal indicative of a value of the detected pressure; a wake circuit for receiving a wireless wake signal and being physically coupled to the processor for providing a signal causing the processor to change from a powered down state to an activated state; and a display physically coupled to the processor for providing a visible indication of detected pressure value in accordance with the processor output signal.

In one embodiment, a tire pressure gauge has a port adapted to couple to and be mounted on a vehicle tire valve stem and to open a valve in the valve stem; a chamber in physical communication with the port; a pressure transducer in the chamber for detecting a pressure of a fluid within the vehicle tire and providing an output signal representative of the detected pressure; a processor physically coupled to the pressure transducer for receiving the output signal, and for providing a processor output signal indicative of a value of the detected pressure; a memory for storing a parameter; a wireless receiver; a display physically coupled to the processor for providing a visible indication of detected pressure value in accordance with the processor output signal; wherein the processor is adapted to cause a value of the parameter received by the receiver to be stored by the memory, and wherein the processor is adapted to determine the processor output signal based on the parameter and the detected pressure.

In another embodiment, a method for displaying an indication relating to the fluid pressure within a vehicle tire having a valve stem includes the steps of receiving at a wake circuit a wireless wake signal; receiving from the wake circuit an activation signal; receiving via a wired connection from an active pressure transducer in a chamber, the chamber being in physical communication with a port adapted to couple to and be mounted on the valve stem and to open a valve in the valve stem, an output signal representative of pressure in the tire; and outputting a signal via a wired connection to a display to cause the display to provide a visible indication of the detected pressure.

In another embodiment, a method of providing an indication relating to the fluid pressure within a vehicle tire having a valve stem, includes the steps of receiving via wireless communication information related to fluid pressure; storing in memory a parameter based on the received information; receiving via a wired connection from an active pressure transducer in a chamber, the chamber being in physical communication with a port adapted to couple to and be mounted on the valve stem and to open a valve in the valve stem, an output signal representative of detected pressure in the tire; retrieving the stored parameter from memory; determining, based on the parameter and the signal representative of pressure in the tire, a processor output signal, and providing the processor output signal via a wired connection to a display, the processor output signal causing the display to provide a visible indication of the detected pressure.

In another embodiment, a method of providing an indication relating to the fluid pressure within a vehicle tire having a valve stem, includes the steps of receiving via a wired connection from an active pressure transducer in a chamber, the chamber being in physical communication with a port adapted to couple to and be mounted on the valve stem and to open a valve in the valve stem, an output signal representative of detected pressure in the tire; receiving via a wired connection from a reference pressure transducer at ambient pressure and temperature, an output signal representative of a detected ambient pressure; retrieving a stored reference pressure from memory; executing a compensation algorithm based on the stored reference pressure and the detected ambient pressure; compensating the detected tire pressure based on the result of the compensation algorithm to obtain a compensated detected tire pressure value; and providing an output signal indicative of a value of the compensated detected tire pressure to cause a display physically coupled to the processor to provide a visible indication of the compensated detected tire pressure value.

In another embodiment, a tire pressure gauge for attachment to a valve stem includes a wall defining a chamber having a first port adapted to sealingly engage a valve stem, a probe being mounted in the first port so as to open a needle valve of a valve stem sealingly engaged by the first port, a pressure sensor in the chamber, a memory, a display physically supported on the gauge and capable of at least a first output type, a processor being operatively coupled to the display, pressure sensor and memory; and code being stored in the memory and operable by the processor to: retrieve at least one value indicative of a first threshold tire pressure from the memory, determine a pressure sensed by the pressure sensor, and, cause the display to present information indicative of a relative value of the sensed value to the first threshold tire pressure. The pressure sensor may include one or more pressure dies having a piezoresistive or piezoelectric element whereby changes in an electric current result from changes in pressure.

In another embodiment of the invention, a method for indicating a relative value of a measured tire pressure to at least a first threshold pressure includes retrieving at least a first tire pressure threshold value; comparing a measured pressure measured in a chamber of a gauge having a port sealingly engaged with a valve stem to the first tire pressure threshold value; and displaying information indicative of a result of the step of comparing.

BRIEF DESCRIPTION OF THE DRAWINGS

Understanding of the present invention will be facilitated by considering the following detailed description of the preferred embodiments of the present invention taken in conjunction with the accompanying drawings, in which like numerals refer to like parts, and.

DETAILED DESCRIPTION OF THE PREFERRED EMBODIMENTS OF THE INVENTION

It is to be understood that the figures and descriptions of the present invention have been simplified to illustrate elements that are relevant for a clear understanding of the present invention, while eliminating, for the purpose of clarity, many other elements found in typical pressure sensing systems and methods. Those of ordinary skill in the art may recognize that other elements and/or steps are desirable and/or required in implementing the present invention. However, because such elements and steps are well known in the art, and because they do not facilitate a better understanding of the present invention, a discussion of such elements and steps is not provided herein.

Further, it should be understood that the several views of the housings, displays and general configurations shown in the figures include many decorative or ornamental features, aspects of which the particulars may be changed while maintaining the device's utility and without departing from the scope and spirit of the present invention.

Figure 1:
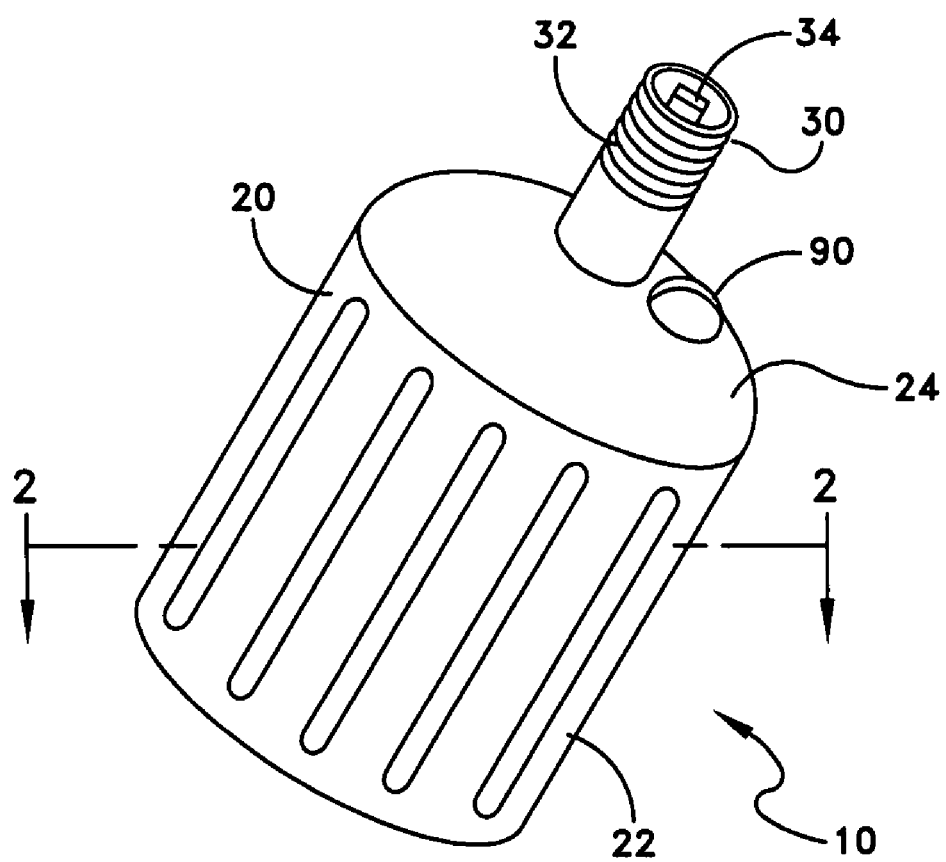
FIG. 1 is an exterior isometric view of a tire pressure gauge according to an embodiment of the present invention.

Referring to FIG. 1, tire pressure gauge 10 has a wall 20, which includes cylindrical sidewall 22 and planar top wall 24, as well as a planar bottom wall, not shown in FIG. 1. Wall 20 defines an interior chamber, described below. Port 30 in wall 20 is provided, and includes a passage which communicates with and is open into the interior chamber, which passage may be closed by a valve (not shown in FIG. 1), such as a bleeder or pin valve. Port 30 is adapted to be attached to a nozzle of a conventional air hose, and has a threaded cylindrical outer surface 32 adapted to mate with a correspondingly threaded boss in a nozzle of such an air hose. Port 30 has a central rod or needle 34 which, when engaged, such as by a central pin in a nozzle of an air hose, opens a bleeder or pin valve associated with port 30. Display 90 has at least one and may include additional output types, each of which is distinguishable from the other output types to the human eye, and may include outputs of different colors, generated, for example, by multi-mode LED's, or by emitters, such as LED's, of different colors.

Figure 2:
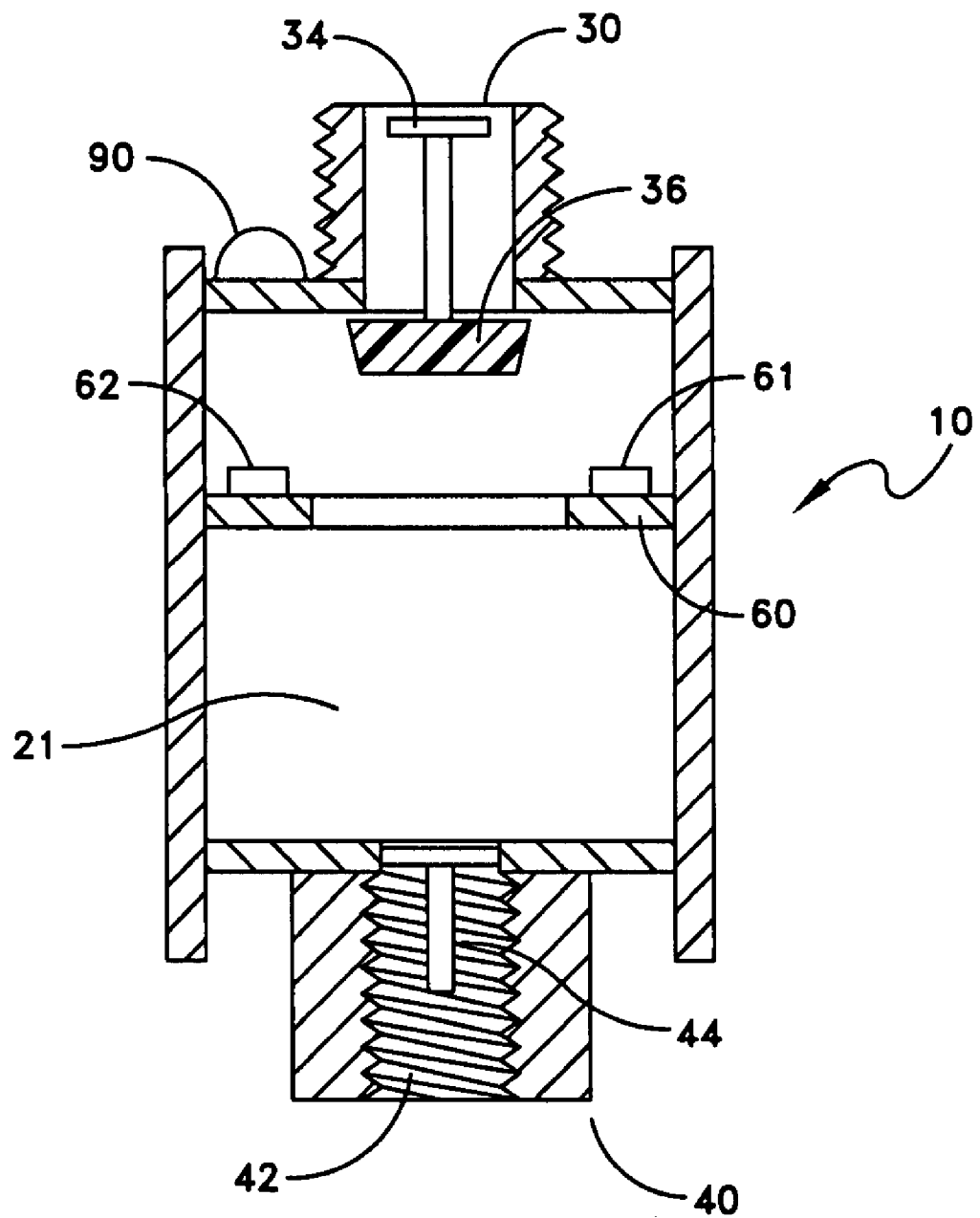
FIG. 2 is a cross-section, taken along line 2-2 of FIG. 1, of the tire pressure gauge of FIG. 1.

Referring now to FIG. 2, there is shown a cross-section, taken along line 2-2, of the tire pressure gauge 10 of FIG. 1. Chamber 21 defined within wall 20 can be seen. Chamber 21 has openings only at port 30 and port 40, and is otherwise sealed. At port 30, a valve is provided to selectively seal port 30. Port 40 is adapted to engage with and open the needle valve on a suitable tire valve stem. Port 40 is preferably adapted to engage with and open the needle valve on a conventional tire valve stem, so that the conventional tire valve stem requires no modification for installation of a device in accordance with the invention. A tire valve stem is typically in the form of a tube, threaded on the exterior near the end thereof, to permit attachment of a protective cap, and having a valve, referred to variously as a pin valve, bleeder valve, or Schrader valve. This type of valve is kept normally closed by a combination of air pressure and a spring urging a stopper into contact with an opening. A pin extending out of the valve may be urged inward, such as by a piston in a nozzle of a service station air hose, to open the valve to permit the introduction of pressurized air into the tire.

Port 40 has a threaded boss 42 adapted to sealingly engage with a threaded tire valve stem. Pin 44 within boss 42 is adapted to open a needle valve on a valve stem when port 40 is in engagement with a suitable valve stem. PCB 60 is interior to chamber 21 and has thereon devices indicated generally at 61, 62. Port 30 has a pin valve including a stopper 36 that is normally closed by pressure within chamber 21, or may be spring loaded. Pin 34 is coupled to stopper 36 so that urging of pin 34 toward chamber 21 causes stopper 36 to disengage and permit air to move between chamber 21 and the interior of port 30. Thus, with gauge 10 affixed to a valve stem of a tire, the tire may be pressurized by engaging the nozzle of a service station air hose with port 30.

Figure 3:
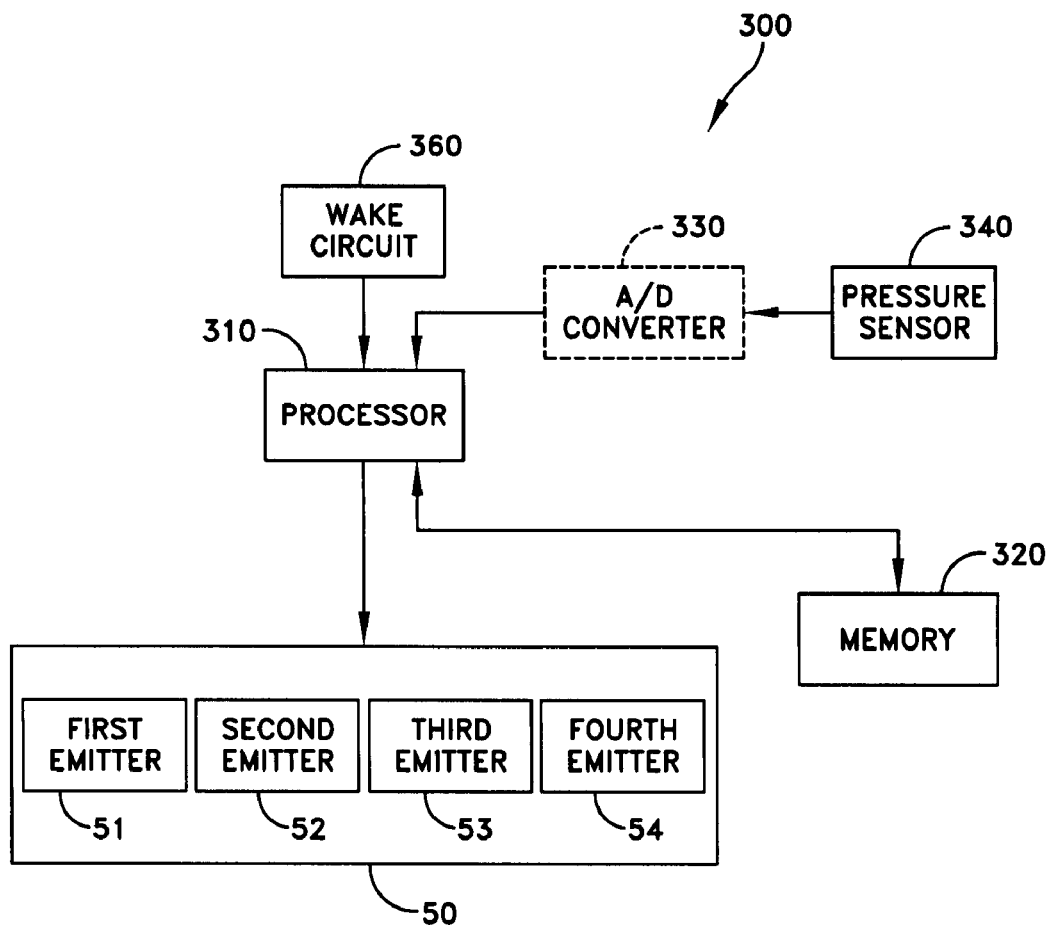
FIG. 3 is a block diagram of components of the tire pressure gauge of FIG. 1.

As set forth above, gauge 10 includes a pressure sensor located within wall 20 defining chamber 21. Referring now also to FIG. 3, there is shown a block diagrammatic view of an arrangement 300 suitable for use within chamber 21 of FIGS. 1 and 2. Arrangement 300 generally includes a processor 310, memory 320, optional analog to digital converter 330 and pressure sensor 340.

"Processor", as used herein, generally refers to a circuit arrangement that may be contained on one or more silicon chips, and/or integrated circuit (IC) boards, and that contains a Central Processing Unit (CPU). The CPU may generally include an arithmetic logic unit (ALU), which performs arithmetic and logical operations, and a control unit, which extracts instructions from memory and decodes and executes them, calling on the ALU when necessary.

Processor 310 may take the form of a microprocessor, and may be a low power CMOS processor with an embedded analog to digital converter, by way of non-limiting example only. The present invention is operable with computer storage products or computer readable media that contain program code for performing the various computer-implemented operations. The computer-readable medium is any data storage device that can store data which can thereafter be read by a computer system such as a microprocessor. The media and program code may be those specially designed and constructed for the purposes of the present invention, or they may be of the kind well known to those of ordinary skill in the computer software arts. Examples of computer-readable media include, but are not limited to magnetic media such as hard disks, floppy disks, and magnetic tape; optical media such as CD-ROM disks; magneto-optical media; and specially configured hardware devices such as application-specific integrated circuits (ASICs), programmable logic devices (PLDs), and ROM and RAM devices. Examples of program code include both machine code, as produced, for example, by a compiler, or files containing higher-level code that may be executed using an interpreter.

Processor 310 may include multiple inputs and outputs. In the exemplary configuration illustrated in FIG. 3, processor 310 has an input coupled to wake circuit 360. An output of processor 310 is coupled to display 50. Processor 310 may also be coupled to memory 320 to allow it to access its data contents. Processor 310 may have an input coupled to pressure sensor 340 optionally via analog-to-digital converter (A/D) 330. For example, where pressure sensor 340 provides an analog output signal indicative of a pressure sensed using port 30, A/D converter 330 may communicate a digital signal indicative of the analog signal output from pressure sensor 340 to processor 310. Where pressure sensor 340 provides a digital signal directly, A/D converter 330 may optionally be omitted. Also, where processor 310 is adapted to receive analog signals output from pressure sensor 340 directly, A/D converter 330 may optionally be omitted. A/D converter 330 may be selected based upon size limitations of chamber 21, an expected output from pressure sensor 340, accepted input for processor 310 and available power sources (not shown) for device 10 (such as one or more batteries contained within chamber 21), for example.

Memory 320 may be internal or external to processor 310. As used herein, "memory" refers generally to one or more devices capable of storing data, such as in the form of chips, tapes or disks. Memory may take the form of one or more random-access memory (RAM), read-only memory (ROM), programmable read-only memory (PROM), erasable programmable read-only memory (EPROM), or electrically erasable programmable read-only memory (EEPROM) chips, by way of further non-limiting example only.

Memory 320 may store information, or may be programmed to store information, e.g., data, indicative of threshold values for a tire, and/or previous measurements. The memory can be configured to store threshold values for tire pressures. By way of example, for use with tires for a passenger vehicle having a manufacturer recommended tire pressure of 30 pounds per square inch (psi), the threshold values may be 30 psi and 27 psi. In one configuration, the threshold values stored in memory of gauge 10 are configured so as to be associated with a particular type of tire. For example, a first threshold value may be the manufacturer recommended tire inflation for the pre-associated tire, and a second threshold value may be a selected percentage, such as about five percent or about ten percent, or a selected or numerical value, less than the first threshold value. For example, where the gauge 10 is distributed in connection with new tires for a vehicle, or is obtained for use with a fleet, tire installation personnel may define threshold values prior to providing the device to the vehicle operator. As will be evident to one possessing an ordinary skill in the pertinent arts, user activation of the device will cause the processor to retrieve the threshold pressure values from memory for comparison with measured pressure values.

Display 50 may include one or more separate components, and in the exemplary embodiment illustrated in FIG. 3, display 50 includes three separate components, first emitter 51, second emitter 52 and third emitter 53. Each of first emitter 51, second emitter 52, and third emitter 53 may emit a visible signal which is distinguishable to the human eye from the signals emitted by the other emitters. By way of example, first emitter 51 may emit a green light, such as by a green light emitting diode, second emitter 52 may emit a yellow light, such as by a yellow light emitting diode, and third emitter 53 may emit a red light, such as by a red light emitting diode. It will be appreciated that display 50 may provide two or more alternative signals. For example, display 50 may include a single emitter, and device 10 may activate the emitter if the detected pressure is at least a first threshold, and not activate the emitter if the detected pressure is less than the first threshold. By way of further example, one or more emitters may be activated in varying patterns of on and off depending on the result of a comparison with one or more thresholds. For example, a continuous activation of an emitter may indicate an acceptable pressure, a slow blinking activation may indicate pressure between first and second thresholds, and a fast blinking activation may indicate pressure below a second threshold. By way of further example, display 50 may include a multi-color light-emitting diode, or multi-color LED, lamp. Multi-color LED lamps are commercially available.

Pressure sensor 340 may be any one of a number of conventional sensors for detecting fluid pressure, and particularly air pressure, and selected to provide acceptable response over a range of pressures anticipated in a particular application. By way of example, pressure sensor 340 may incorporate a MEMS based pressure die.

Figure 4:
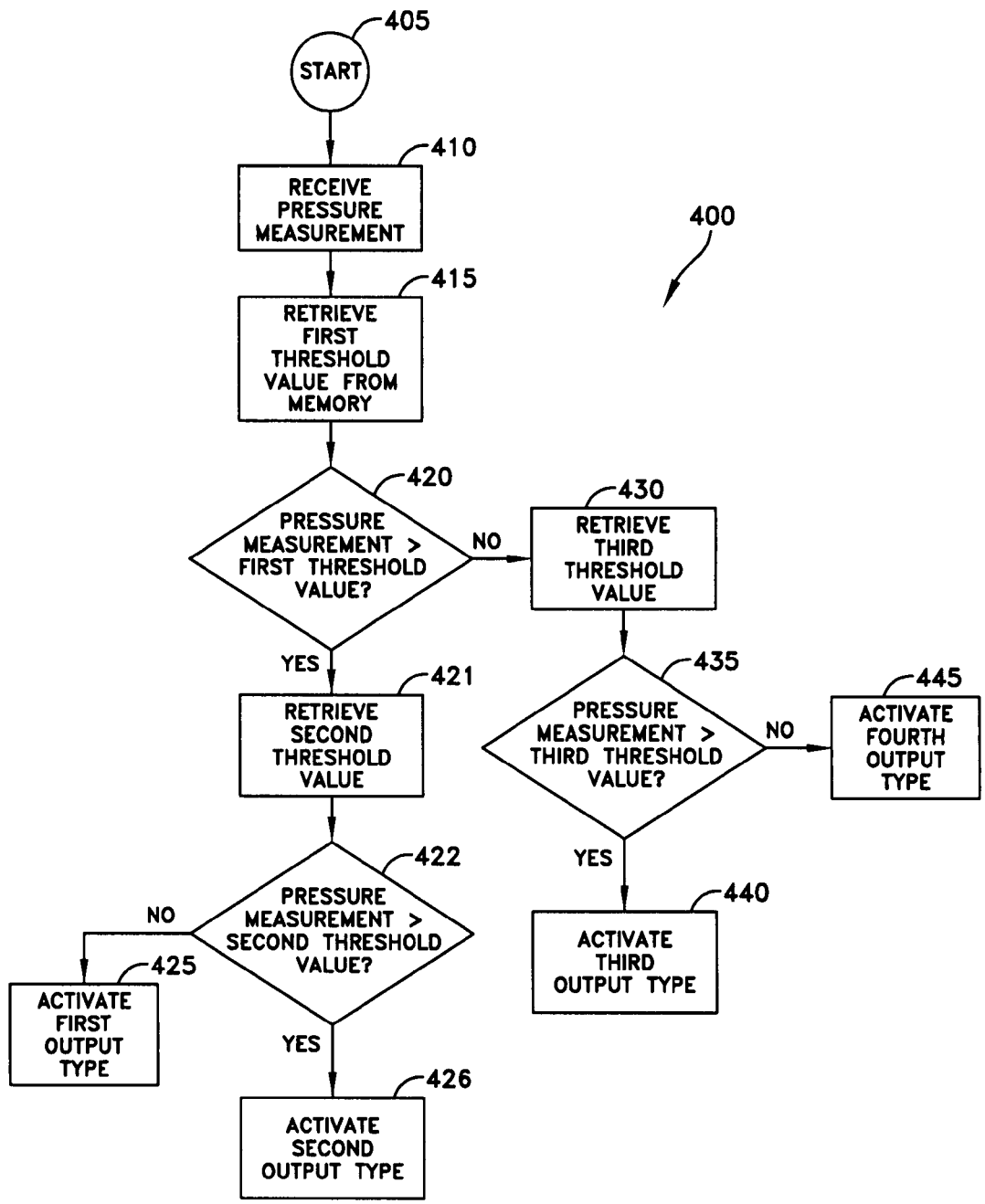
FIG. 4 is a process flow diagram of a method of measuring and displaying a tire pressure value in accordance with an embodiment of the invention.

Referring now also to FIG. 4, there is shown a block diagrammatic representation of a process 400 according to an aspect of the present invention, and being suitable for use with gauge 10 of FIG. 1. Processor 310 may be turned on by activating wake up circuit 360. Wake up circuit may be wirelessly activated from a source, such as a handheld device. For example, wake up circuit 360 may include an RF receiver which receives a suitable remote RF signal. Alternatively, wake up circuit 360 may include a circuit which is activated by a suitably strong magnet held in the vicinity of gauge 10. In principle, wake up circuit may be coupled to an infrared receiver which receives a remote IR signal. The wake up circuit may alternatively be coupled to an ultrasound receiver which receives an ultrasound signal propagated through the air from a source of ultrasound signals. A handheld device may be provided to produce the remote RF signal, IR signal, magnetic field, ultrasound signal, or other wirelessly propagated signal or field. Upon receipt of the remote RF signal, IR signal, ultrasound signal or magnetic field, a wake up signal generated by wake up circuit 360, may, for example, cause power to be provided to processor 310, in order to activate it, or such wake up signal may be sensed by processor 310 to cause it to switch into an active mode, as indicated by START block 405. Upon activation, processor 310 may optionally have certain initialization procedures it follows, such as checking memory and/or calibrating one or more inputs, for example. As indicated at block 410, processor 310 receives a measured tire pressure value from pressure sensor 340. The measured tire pressure value may be received from pressure sensor 340 via optional A/D converter 330. Processor 310 may store the received measured tire pressure value in memory. Processor 310 may then retrieve a first threshold value from memory, as indicated by block 415. The first threshold value may be, for example, 90 percent of a recommended tire pressure. Processor 310 may then compare the received measured tire pressure value to the first threshold value to determine whether the received measured tire pressure value is greater than or equal to the first threshold value, as indicated by block 420. If the result of the comparison is that the measured pressure value is greater than or equal to the first threshold value, then the processor proceeds to retrieving a second threshold value from memory, as indicated by block 421. The second threshold value may be a value greater than a recommended tire pressure value such as 120 percent of a recommend tire pressure value. The process flow then proceeds to determining whether the received measured tire pressure value is greater than or equal to the second threshold value, as indicated by block 422. If the result of the comparison is that the measured value is less than the second threshold, then the process flow proceeds to activating a first output type of the display 50, as indicated by block 425. A first output type may provide an indication that the pressure is acceptable, and may be in the nature of, by way of example, activation of a green LED, activation of a multi-color LED to provide a green output, or activation of a lamp to provide a continuous light or an on/off pattern, any one of which may be understood by a user to indicate an acceptable pressure value. If the result of the comparison is that the measured value is greater than the second threshold, then the process flow proceeds to activating a second output type of the display 50, as indicated by block 426. A second output type may provide an indication that the pressure represents a significant overpressurization, and may be in the nature of, by way of example, activation of a blue LED, activation of a multi-color LED to provide a blue output, or activation of a lamp to provide a continuous light or an on/off pattern, any one of which may be understood by a user to indicate a significant overpressurization, requiring a reduction in pressure.

If the result of the comparison step of block 420 is that the measured tire pressure is less than the first threshold, then the processor retrieves a third threshold value from memory, as indicated by block 430. The third threshold value may be a value selected to indicate a threshold between slight under pressurization and unacceptably low pressurization, such as 80% of a target pressure. The process then compares the measured tire pressure to the third threshold value, as indicated by block 435. If the result of the comparison is that the pressure measurement is equal to or greater than the third threshold value, then the process flow proceeds to activating a third output type, as indicated by block 440. The third output type is distinguishable to a user from the first and second output types. By way of example, the third output type may be an LED of a different color from an LED of the first and second output types. The third output type may be an activation of a yellow LED, where the first output type is an activation of a green LED, and the second output type is activation of a blue LED. If the display 50 includes a multi-color LED, the third output type may be an activation of the multi-color LED to provide a different color from that of the first and second output types. The third output type may be a different pattern of on/off from that of the first and second output types; for example, the first output type may be a continuous on; the second output type may be blinking at a specified rate; and the third output type may be blinking at a rate different from the blinking of the second output type.

If the result of the comparison of the measured pressure and the third threshold value is that the measured pressure is less than the third threshold value, then the process flow proceeds to activation of a fourth output type, as indicated by block 445. If measured pressure is below the third threshold value, then, in some embodiments, the measured pressure is sufficiently below the recommended pressure as to result in undesirable effects such as excessive wear on the tire and reduced fuel economy. Accordingly, a fourth output type may be, for example, a red light, such as a red LED, or a red output of a multi-color LED.

Figure 5:
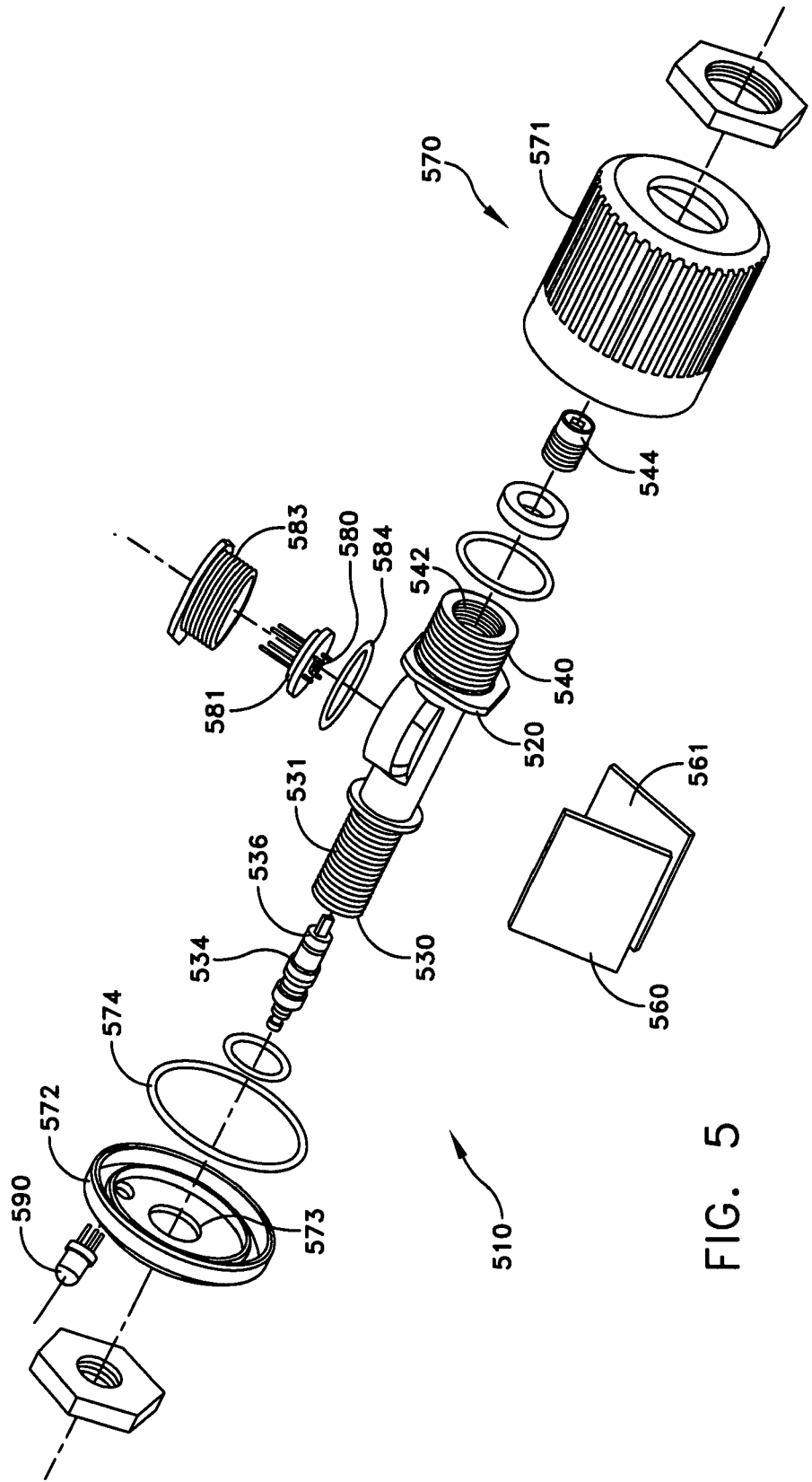
FIG. 5 is an exploded view of a tire pressure gauge in accordance with an embodiment of the invention.

Referring now to FIG. 5, an exploded view of another embodiment of a tire pressure gauge in accordance with the invention is shown. In the embodiment of FIG. 5, tire pressure gauge 510 has an outer housing 570. Outer housing may be substantially cylindrical, and have two pieces, namely a body portion 571 open at both ends and a cap 572 that closes a distal opening of body portion 571, while leaving a distal housing opening 573. O-ring 574 may be provided to seal body 571 to cap 572. Inner housing 520 defines a chamber having first port 540 and second port 530, which chamber has openings only at port 530 and port 540, and is otherwise sealed. At port 530, a valve is provided to selectively seal port 530. Port 540 is adapted to engage with and open the needle valve on a suitable tire valve stem. Port 540 has a threaded boss 542 adapted to sealingly engage with a threaded tire valve stem. Pin 544 within boss 542 is adapted to open a needle valve on a valve stem when port 540 is in sealing engagement with a suitable valve stem. PCB's 561, 562 are mounted exterior to the chamber and within outer housing 570, and may carry thereon devices such as a battery, processor, memory and wake up circuit, such as those discussed above in connection with FIG. 3. A pressure sensing die 580 is positioned on a support 581, and bolt 583 and O-ring 584 seal the corresponding opening in inner housing 520. Port 530 has a pin valve including a stopper 536 that is normally closed by pressure within chamber 521, or may be spring loaded. Pin 534 is coupled to stopper 536 so that urging of pin 534 toward chamber 521 causes stopper 536 to disengage and permit air to move between chamber 521 and the interior of port 530. Port 530 is threaded at 531 so as to have the dimensions and structure of a conventional valve stem. Display 590, which may be, by way of non-limiting example, a multi-mode LED, is mounted to an outer surface of outer housing 570, and particularly to lid 572, and receives control signals from devices mounted on one or both of PCB's 560, 561, via electrical connections that are not shown. It will be appreciated that display 590 may be positioned so as to be visible to one viewing from a top side of device 510, i.e., toward lid 572, but may protrude beyond an outer surface of lid 572, be flush with an outer surface of lid 572, or be recessed below an outer surface of lid 572.

Figure 6:
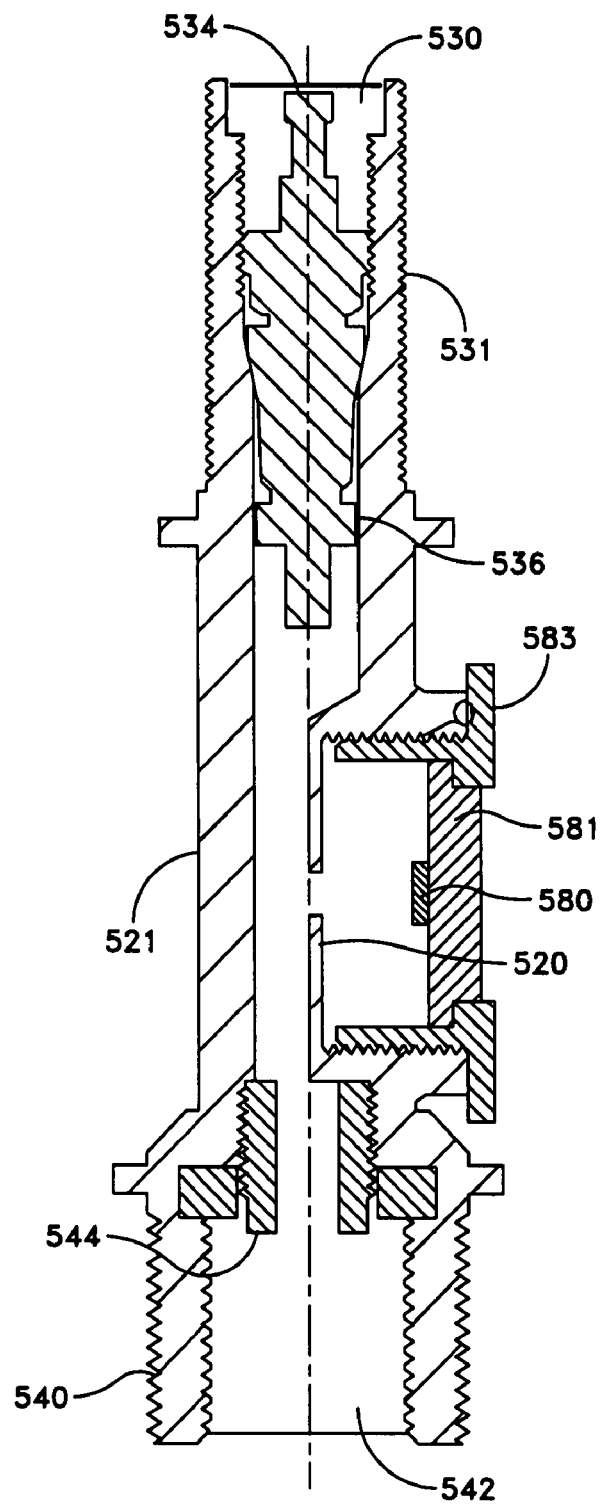
FIG. 6 is a partial sectional view of the tire pressure gauge of FIG. 5.

FIG. 6 is a partial cross-sectional view of device 510 when assembled.

Figure 7:
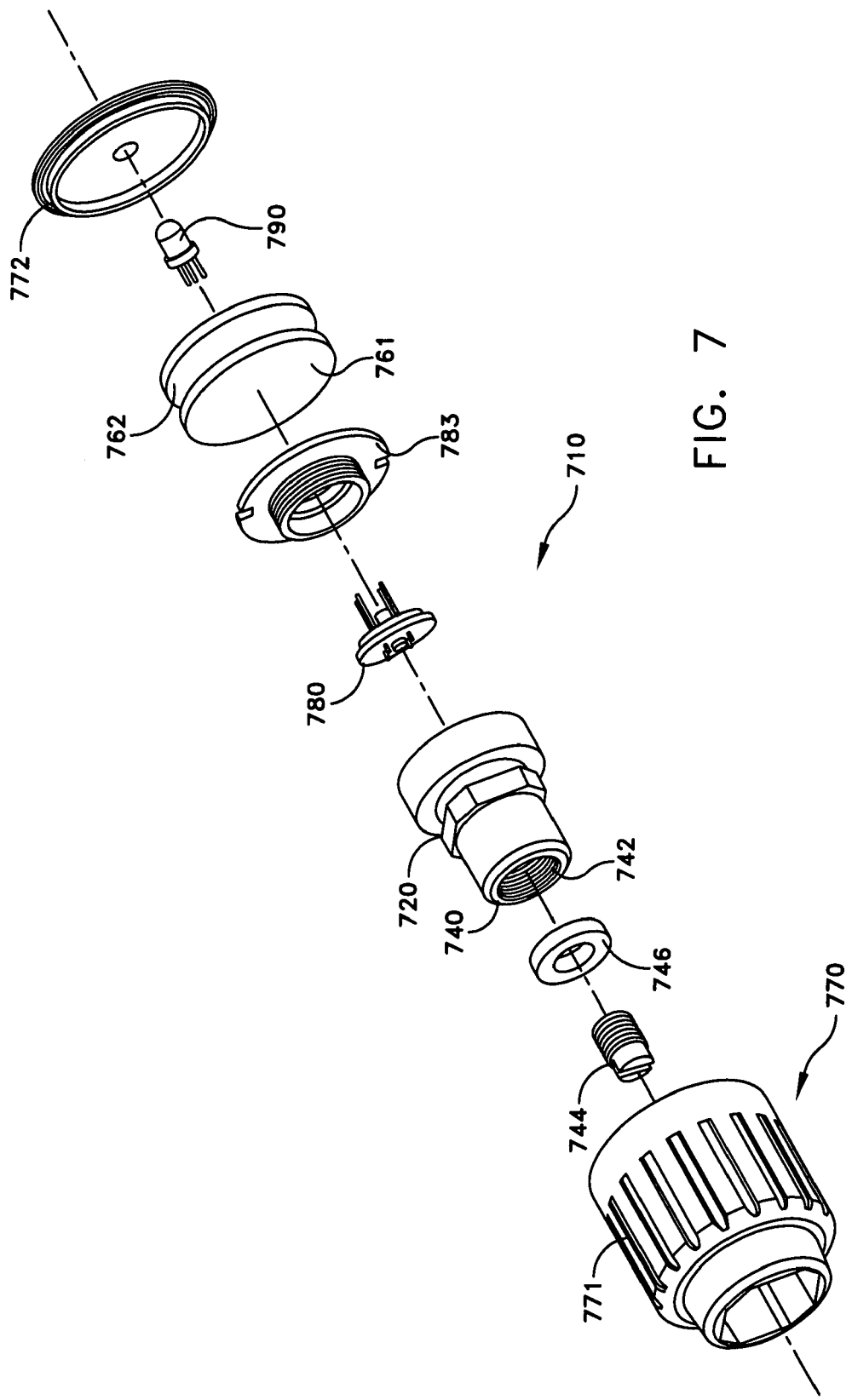
FIG. 7 is an exploded view of a tire pressure gauge in accordance with an alternative embodiment of the invention.
Figure 7A:
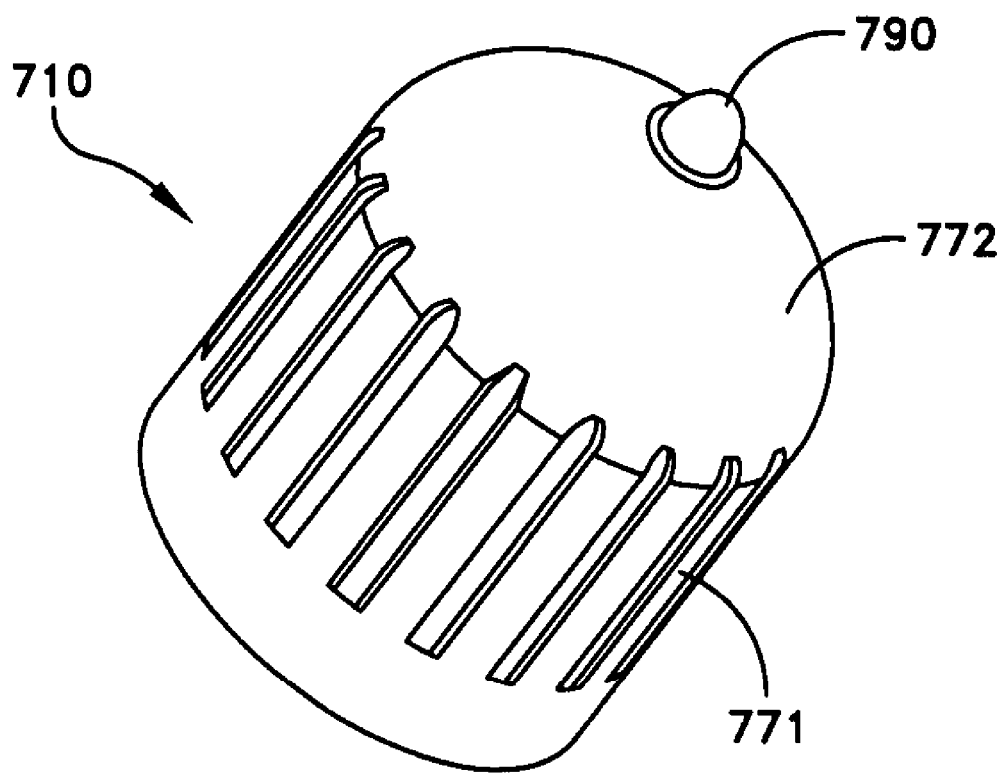
FIG. 7A is a view of the tire pressure gauge of FIG. 7 as assembled.

FIG. 7 is an exploded view of a tire pressure gauge 710 according to another embodiment of the invention, and FIG. 7A is a view of tire pressure gauge 710 when assembled. Tire pressure gauge 710 has a single port for receiving pressurized air from a tire valve stem, but does not have an additional port for receiving pressurized air. Tire pressure gauge 710 may include a device for receiving power wirelessly. By way of example, tire pressure gauge 710 may include one or more radio frequency antennas, such as those used in radiofrequency identification tags (RFIDs). When interrogated by a source of RF radiation at the proper frequency, such an antenna generates a current which may be used variously, directly by a processor and display for power, or to a battery or capacitor for storage and discharge of current to power a processor and display. A user may have a handheld unit that serves as a source of RF radiation at the proper frequency.

Outer housing 770 may be similar to outer housing 570 of FIG. 5. Outer housing 770 may thus be substantially cylindrical, and have two pieces, namely a body portion 771 open at both ends and a cap 772 that closes a distal opening of body portion 771. An opening may be provided for display 790, which may be a multi-mode LED. It will be appreciated that display 790 may be positioned so as to be visible to one viewing from a top side of device 710, i.e., toward lid 772, but may protrude beyond an outer surface of lid 772, be flush with an outer surface of lid 772, or be recessed below an outer surface of lid 772.

Inner housing 720 defines a chamber having an opening, when the tire gauge is fully assembled, only at port 740, and is otherwise sealed. Port 740 is adapted to engage with and open the needle valve on a suitable tire valve stem. Port 740 has a threaded boss 742 adapted to sealingly engage with a threaded tire valve stem. Piston 744 within boss 742 is adapted to open a needle valve on a valve stem when port 740 is in sealing engagement with a suitable valve stem. PCB's 761, 762 are mounted exterior to the chamber and within outer housing 770, and may carry thereon devices such as an RF antenna, battery, capacitor, processor, memory and wake up circuit. LED 790 is electrically coupled to other devices on at least one of PCB's 761, 762, and extends from the end of gauge 710 beyond cap 772 when gauge 710 is fully assembled. A pressure sensing die 780 is positioned at an end of the chamber, and bolt 783 and seals the corresponding opening in inner housing 720.

Figure 8:
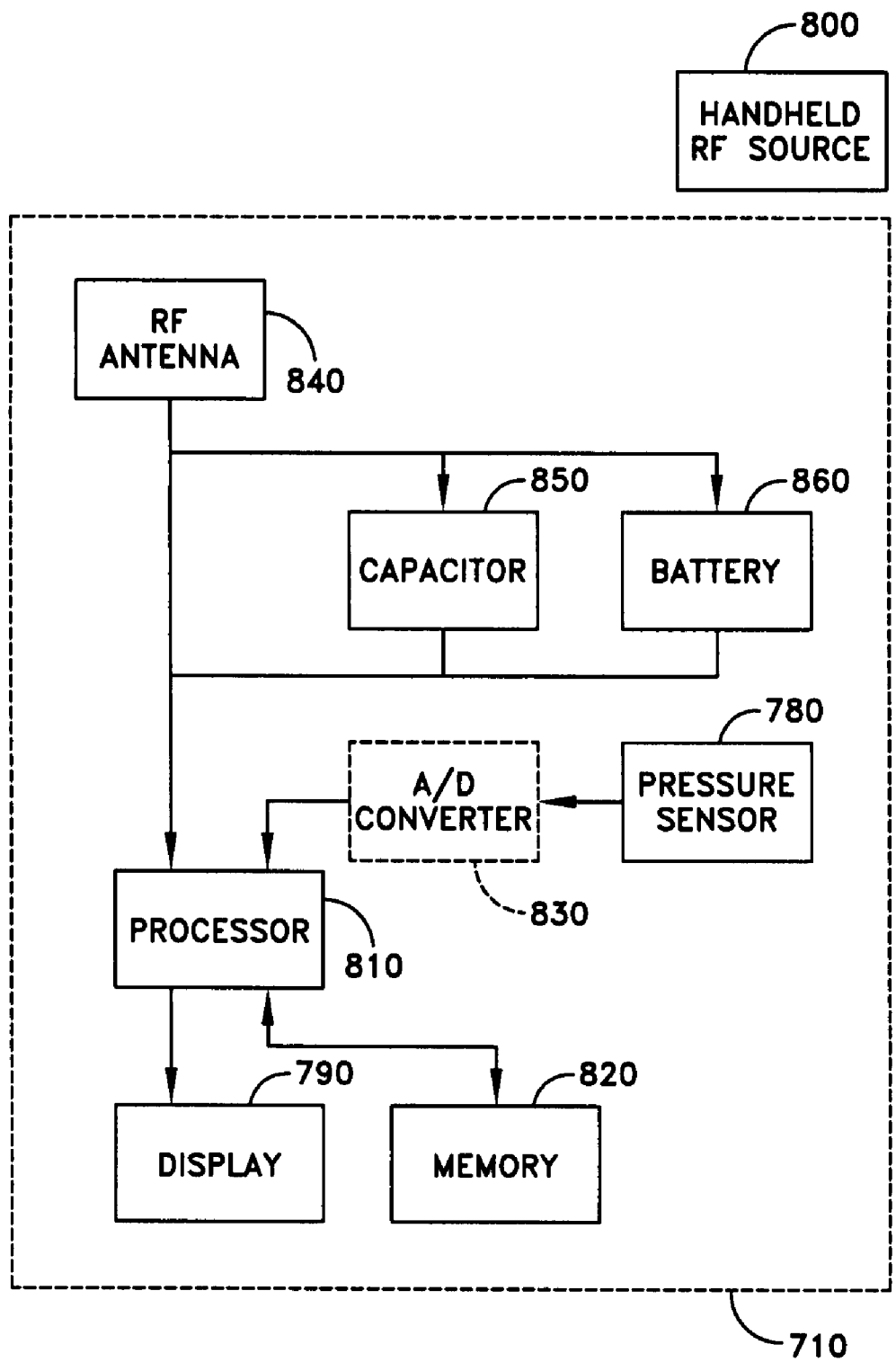
FIG. 8 is a block diagram of components in a tire pressure gauge in accordance with the embodiment of FIG. 7 together with an RF source.

Referring now to FIG. 8, a block diagram of tire gauge 710, in a system together with a handheld RF source 800, is illustrated. Handheld RF source may include an RF antenna, a power source, such as a battery, and a manually operated on/off switch. In use, the user places the handheld RF source 800 in proximity to device 710. The minimum distance between handheld RF source and tire gauge 710 at which device 710 will operate may be, in some embodiments, about three to four feet, so that a user may stand next to the vehicle, holding the handheld RF source 800 in the hand, and activate device 710 by activating handheld RF source 800, without the need to stoop or lean to bring handheld RF source closer than three or four feet from device 710. The minimum distance may be greater in some embodiments, by way of example, sufficiently long that an activating device may be located in a dashboard of the vehicle. When RF radiation from handheld RF source 800 is received by RF antenna 840, a current is produced by RF antenna 840. The current may be provided directly to processor 810, or to a capacitor 850 which then supplies a current to processor 810, or to battery 860, which then supplies a current to processor 810. It will be understood that a suitable voltage is also furnished to pressure sensor 780, optional A/D converted 830, display 790, and memory 820. When the current is provided, processor 810 wakes up, and may proceed through the process steps described above in connection with FIGS. 3 and 4. When the user has observed the display 790 indicating a tire pressure measurement relative to one or more thresholds, then the user will turn off handheld RF source 800. The current will no longer be supplied to processor 810, which will then return to an inactive state.

Figure 9:
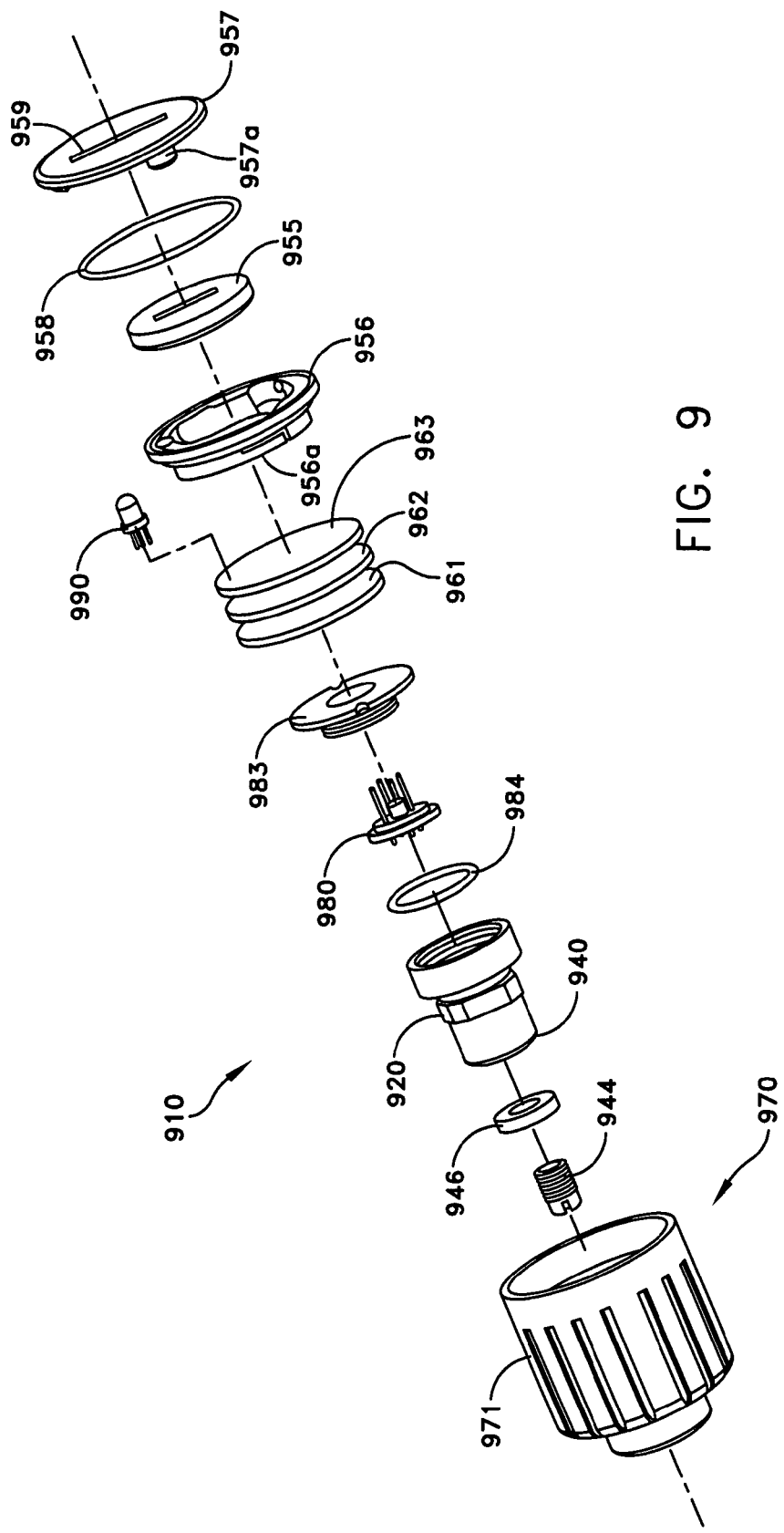
FIG. 9 is an exploded view of a tire pressure gauge in accordance with an alternative embodiment of the invention.

Referring now to FIG. 9, tire pressure gauge 910 is depicted in an exploded view. Tire pressure gauge 910 is generally similar to the tire pressure gauge illustrated in FIG. 7. However, tire pressure gauge 910 has as a power source battery 955 adapted to be removed and replaced easily. In particular, tire pressure gauge 910 includes a battery compartment 956 having a lid 957 which may be removed and replaced readily, and particularly by rotating. Lid 957 is generally a solid cylinder, and has a latch at 957a, which mates with a protrusion at 956a. By placing a flat object, such as a coin or screwdriver blade, into slot 959 in lid 957, the user may turn lid 957 sufficiently to disengage latch 957a from protrusion 956a, and thereby remove lid 957 and remove and replace battery 955. O-ring 958 may be provided to prevent moisture from entering the interior of battery compartment 956.

Outer housing 970 may be substantially cylindrical, and have two pieces, namely a body portion 971 open at both ends and battery compartment 956 that closes a distal opening of body portion 971. An opening may be provided through battery compartment 956 for mounting and electrical connections to display 990, which may be a multi-mode LED. It will be appreciated that display 990 may be positioned so as to be visible to one viewing from a top side of device 910, i.e., toward lid 972, but may protrude beyond an outer surface of lid 972, be flush with an outer surface of lid 972, or be recessed below an outer surface of lid 972.

Inner housing 920 defines a chamber having an opening, when the tire gauge is fully assembled, only at port 940, and is otherwise sealed. Port 940 is adapted to engage with and open the needle valve on a suitable tire valve stem. Port 940 has a threaded boss (not shown) adapted to sealingly engage with a threaded tire valve stem. Piston 944 fits within the threaded boss and is adapted to open a needle valve on a valve stem when port 940 is in sealing engagement with a suitable valve stem. Washer 946 may be provided to assist in sealing port 940 to a valve stem. PCB's 961, 962, 963 are mounted exterior to the chamber and within outer housing 970, and may carry thereon devices such as an RF antenna or other wake up circuit components, processor and memory. LED 990 is electrically coupled to other devices on at least one of PCB's 961, 962, 963 and extends from the end of gauge 910 beyond lid 958 when gauge 910 is fully assembled. A pressure sensing die 980 is positioned at an end of the chamber, and bolt 983, with washer 984, seals the corresponding opening in inner housing 920. An advantage of the embodiment of FIG. 9 is that it may provide the device with a relatively significant power source, without the need to damage any permanent components to replace a battery.

Figure 10:
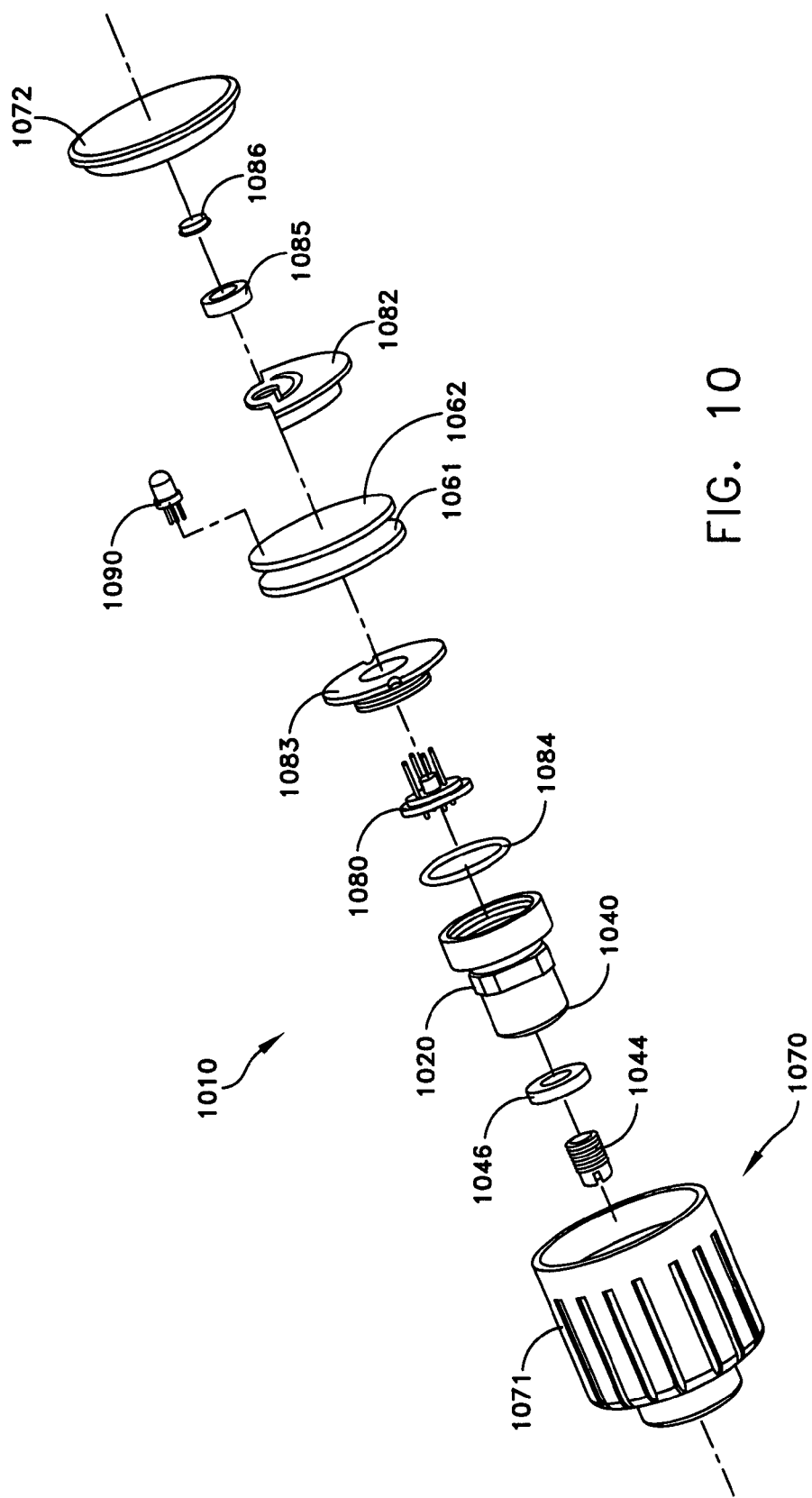
FIG. 10 is an exploded view of a tire pressure gauge in accordance with an alternative embodiment of the invention.

Referring now to FIG. 10, there is shown an exploded view of a tire pressure gauge 1010 in accordance with an embodiment of the invention, in which relative internal motion of components as a result of motion of the device as the tire to which it is attached spins, is stored for later use, such as by being converted to a current and coupled to a battery or capacitor. It will be appreciated that devices that obtain energy from relative motion of internal components caused by motion of the device itself, are well-known. Self-winding watches store energy in this manner, by way of example, by use of an eccentric rotor coupled to a ratchet; motion of the ratchet winds a spring. Techniques applicable to self-winding watches may be applied to a tire pressure gauge in accordance with alternative embodiments of the invention. However, in the embodiment of FIG. 10, an eccentric wheel 1082 oscillates relative to the housing and other components. The depicted form of eccentric wheel 1082 is merely exemplary, and, by way of example, other wheels or objects with unbalanced weight and mounted to rotate, may be employed. Eccentric wheel 1082 is rotatable on mount 1081. Bearing parts 1085, 1086 serve to cause eccentric wheel 1082 to rotate in a plane with minimal friction. Eccentric wheel 1082 has one or more permanent magnets (not shown) mounted thereon. One or more coils (not shown) may be mounted on PCB 1062. A current is generated in the one or more coils when the one or more permanent magnets move, and the current may be employed to recharge one or more rechargeable batteries or capacitors (not shown), which may be mounted, by way of example, on one or more of PCBs 1061, 1062, or an inner surface of housing 1070. Alternatively, eccentric wheel 1082 may be coupled to a piece of piezo film, which, when is subject to stresses and/or strains as a result of the movement of eccentric wheel 1082, provides a current to one or more rechargeable batteries or capacitors.

Outer housing 1070 may be substantially cylindrical, and have two pieces, namely a body portion 1071 open at both ends and lid 1072, which also supports eccentric wheel 1082. An opening may be provided through lid 1072 for mounting and electrical connections to display 1090, which may be a multi-mode LED. It will be appreciated that display 1090 may be positioned so as to be visible to one viewing from a top side of device 1010, i.e., toward lid 1072, but may protrude beyond an outer surface of lid 1072, be flush with an outer surface of lid 1072, or be recessed below an outer surface of lid 1072. It will also be appreciated that lid 1072 may be partially or completely transparent or translucent, and that display 1090 may be mounted interior to housing 1070 but still be visible to a user looking toward lid 1072.

Inner housing 1020 defines a chamber having an opening, when the tire gauge is fully assembled, only at port 1040, and is otherwise sealed. Port 1040 is adapted to engage with and open the needle valve on a suitable tire valve stem. Port 1040 has a threaded boss (not shown) adapted to sealingly engage with a threaded tire valve stem. Piston 1044 fits within the threaded boss and is adapted to open a needle valve on a valve stem when port 1040 is in sealing engagement with a suitable valve stem. Washer 1046 may be provided to assist in sealing port 1040 to a valve stem. PCB's 1061, 1062 are mounted exterior to the chamber and within outer housing 1070, and may carry thereon devices such as an RF antenna or other wake up circuit components, processor, memory, battery and/or capacitor. LED 1090 is electrically coupled to other devices on at least one of PCB's 1061, 1062 and extends from the end of gauge 1010 beyond lid 1072 when gauge 1010 is fully assembled. A pressure sensing die 1080 is positioned at an end of the chamber, and bolt 1083, with washer 1084, seals the corresponding opening in inner housing 1020. An advantage of the embodiment of FIG. 10 is that it may provide the device with an internal source of power.

Figure 11:
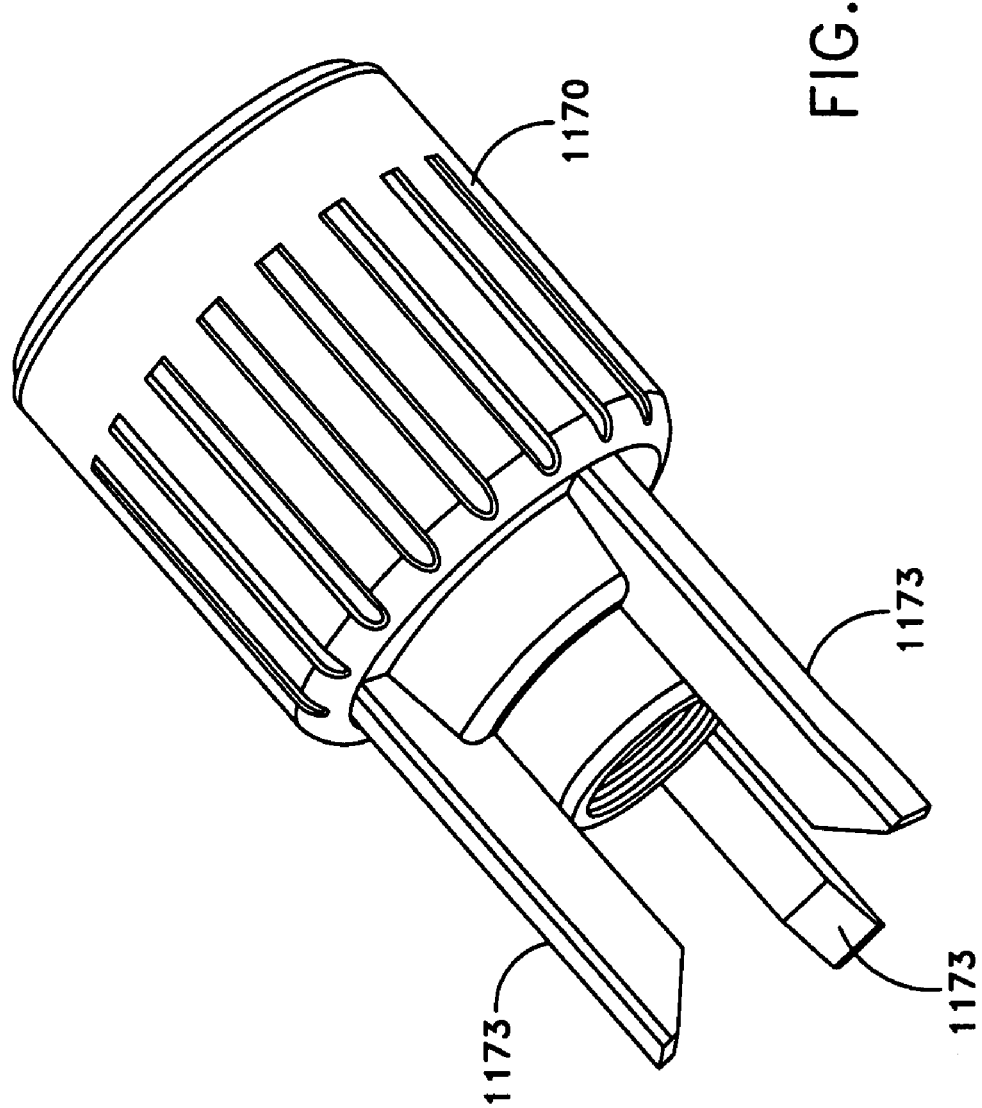
FIG. 11 is a view of an alternative embodiment of a tire pressure gauge outer housing in accordance with the invention.

Referring now to FIG. 11, an alternative embodiment of a cap is shown. Cap 1170 has at least one extension that is adapted to engage substantially opposing sides of a valve cap. In the illustrated embodiment, a plurality of fingers 1173 extend from cap 1170 and are adapted to engage the sides of a valve stem when the device is engaged with a valve stem. Fingers 1173 preferably are adapted to engage sides of a valve stem under tension. Fingers 1173 serve to provide additional stability to a tire pressure gauge in accordance with an embodiment of the invention. While three fingers 1173 are shown, the fingers may take any desired shape, and any form of extension that provides tension on substantially opposite sides of cap 1170 would assist in stabilizing the device. It will be appreciated that one or more of fingers 1173 may be hollow and enclose components of a tire pressure gauge.

Figure 12:
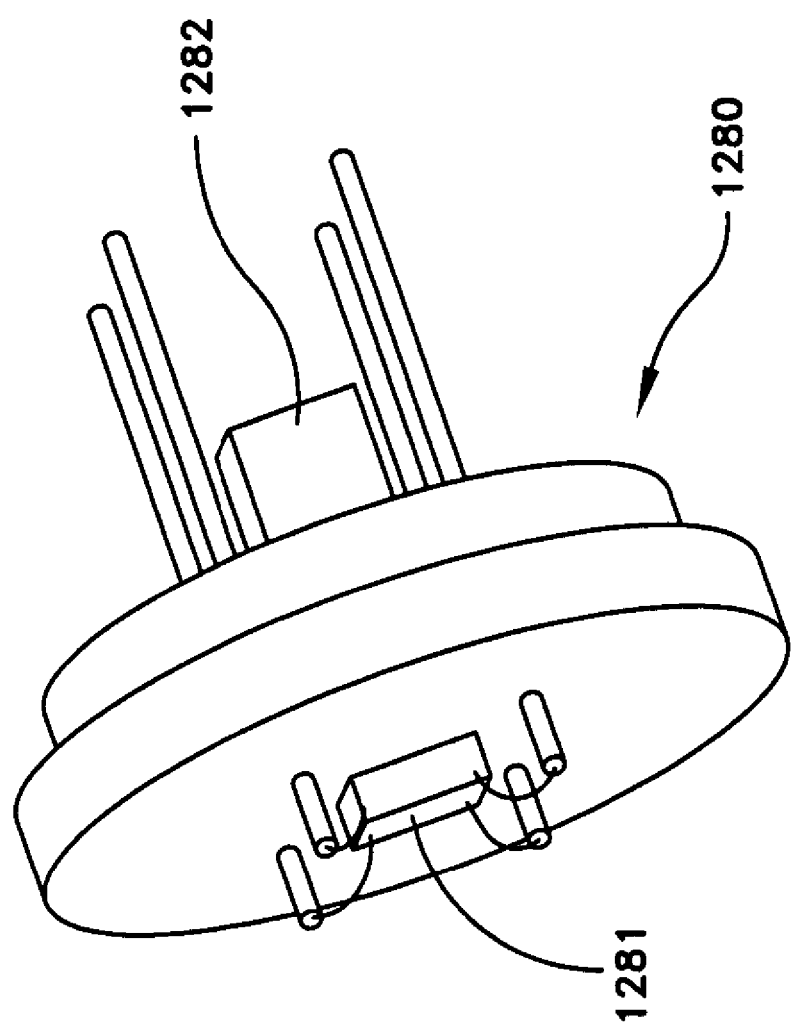
FIG. 12 is a view of an alternative embodiment of a pressure module in accordance with the invention.

Referring now to FIG. 12, there is shown an alternative embodiment of a pressure sensing module, with an additional sensor, which may either be a pressure sensing die or a temperature sensor, provided. In this embodiment, module 1280 has a pressure sensing die 1281 on the side facing an interior chamber, so that pressure sensing die 1281 provides a signal indicative of a pressure in the chamber. On the opposite side of module 1280 a second pressure sensing die 1282 is provided. Pressure sensing die 1282 may be employed to obtain a relative pressure. Temperature readings may also be obtained. Alternatively, a single die with multiple sensors may be provided. Multiple sensor dies may be provided for the purpose of offset compensation, as will be appreciated by those of skill in the art.

Figure 13:
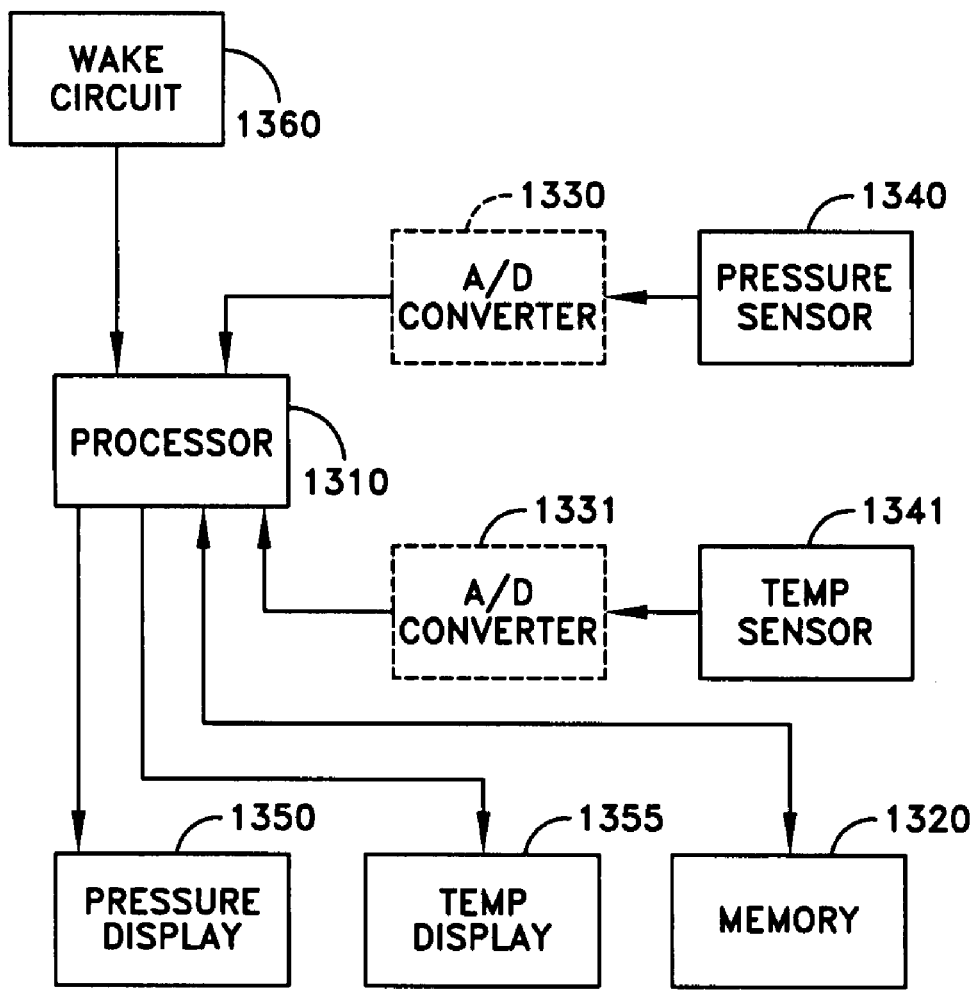
FIG. 13 is a block diagram of an alternative embodiment of a tire pressure gauge according to the invention.

Referring now to FIG. 13, there is shown a block diagram of an embodiment of the invention having a pressure sensor and a temperature sensor, as well as a pressure display and a temperature display. Processor 1310, wake circuit 1360, memory 1320, pressure sensor 1340 and optional A/D converter 1330 may be the same as those discussed above in connection with FIG. 3. Temperature sensor 1341 provides an output signal indicative of a pressure of the air in the chamber, and thus indicative of the air temperature in the tire. Temperature sensor outputs its signal to optional A/D converter 1331, which provides the digitized signal to processor 1310. Processor 1310 retrieves threshold pressure and temperature values from memory 1320, and compares the threshold values to the values received from pressure sensor 1340 and temperature sensor 1341. A threshold temperature value may be equal to a temperature designated by a tire manufacturer as the highest safe operating temperature of the tire. Depending on the comparison results, processor 1310 provides suitable signals to pressure display 1350 and pressure display 1355. Pressure display 1350 may be, for example, a multi-mode LED. Temperature display 1355 may take any of the forms discussed above with respect to pressure displays. By way of example, pressure display 1350 may employ green, yellow and orange indications, respectively, for pressure at least at a highest threshold, pressure between a high threshold and a low threshold, and pressure below a low threshold, and temperature display 1355 may employ a red indicator for a temperature above a threshold and a blue indicator for a temperature below a threshold. It will be appreciated that pressure display 1350 and temperature display 1355 preferably employ different colors.

Figure 14:
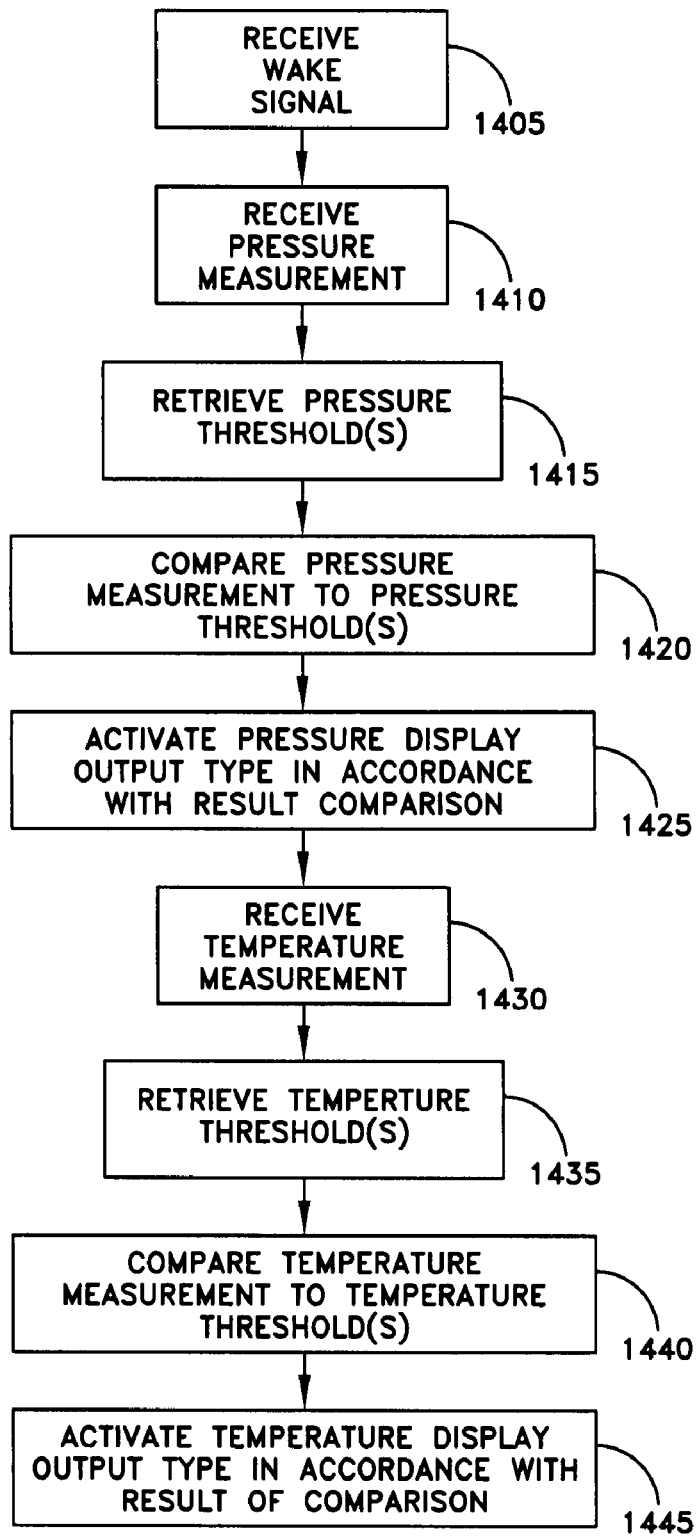
FIG. 14 is a process flow diagram of a process performed by a tire pressure gauge of FIG. 13.

Referring now to FIG. 14, there is shown a process flow diagram of a method of operating the device of FIG. 13. A handheld device may be provided to produce a remote RF signal, IR signal, or magnetic field. Upon receipt of the remote RF signal, IR signal or magnetic field, a wake signal generated by wake circuit 1360, may, for example, cause power to be provided to processor 1310, in order to activate it, or such wake up signal may be sensed by processor 1310 to cause it to switch into an active mode, as indicated by block 1405, stating RECEIVE WAKE SIGNAL. Upon activation, processor 1310 may optionally have certain initialization procedures it follows, such as checking memory and/or calibrating one or more inputs, for example. As indicated at block 1410, processor 1310 receives a measured tire pressure value from pressure sensor 1340. The measured tire pressure value may be received from pressure sensor 1340 via optional A/D converter 1330. Processor 1310 may store the received measured tire pressure value in memory. Processor 1310 may then retrieve one or more pressure threshold values from memory, as indicated by block 1415. As explained above, there may be multiple threshold values. Processor 1310 may then compare the received measured tire pressure value to one or more of the received pressure threshold values, as indicated by block 1420. As explained above, there may be multiple steps of retrieval of pressure threshold values and comparisons before a result is reached. In accordance with the result of comparison, processor 1310 activates pressure display 1350 to provide an output type in accordance with the result of the comparison. Output types may include any type of output which is distinguishable to the human eye, and may include activation of a lamp, such as an LED, of a particular color for each output type, or activation of a multi-mode LED to provide a particular color for each output type.

As indicated by block 1430, processor 1310 receives a signal indicating a value of a temperature measurement from temperature sensor 1341, optionally by way of optional A/D converter 1331. Processor 1310 may then retrieve one or more temperature thresholds from memory 1320, as indicated by block 1435. A temperature threshold may be, by way of example, a maximum recommended operating temperature for a tire. A second temperature threshold may be, for example, a small amount, such as 10 degrees Fahrenheit, less than the maximum recommended operating temperature. Processor 1310 may then compare the temperature measurement to each of the retrieved threshold values, as indicated by block 1440. It will be appreciated that processor 1310 may retrieve each threshold, compare that threshold to the measured temperature, and then either proceed to retrieve another threshold or proceed to the next step, depending on the result of the comparison. Based on the result of the comparison, processor 1310 causes temperature display 1355 to activate an output type corresponding to the result of the comparison, as indicated by block 1445. As indicated above, output types are any type of output which can be distinguished by the human eye, and may include different colors or patterns of blinking, by way of example.

Figure 15:
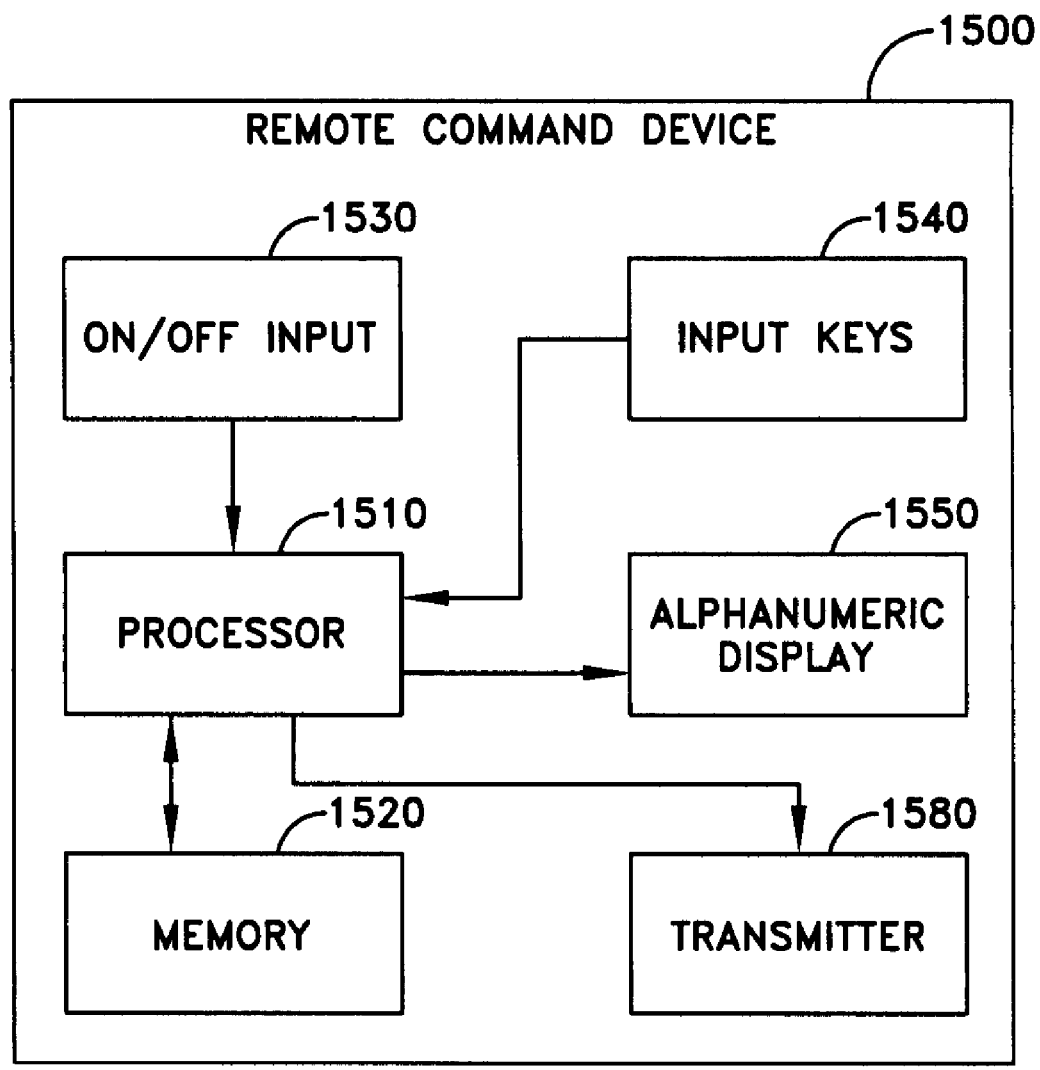
FIG. 15 is a block diagram of an embodiment of a remote control unit according to the invention.

Referring now to FIG. 15, there is shown a block diagram of a remote command device which may be employed with a tire pressure gauge described herein to cause a value to be displayed and to store new threshold values in, for example, memory 320. Remote command device 1500 has a processor 1510, which may be, by way of non-limiting example, a microprocessor. Memory 1520 of remote command device 1500 may be internal or external to processor 1510 and may take the form of one or more random-access memory (RAM), read-only memory (ROM), programmable read-only memory (PROM), erasable programmable read-only memory (EPROM), or electrically erasable programmable read-only memory (EEPROM) chips, by way of non-limiting example only. An on/off input 1530 may include a user-operable on/off switch and a circuit to provide a wake signal to processor 1510 when a user operates the on/off switch to activate the device. Input keys 1540 are user-operable and provide inputs to processor 1510. By way of non-limiting example, input keys 1540 may include "up" and "down" keys for scrolling through menus, and a "select" key for selecting a displayed and highlighted or otherwise designated menu item. Alphanumeric display 1550 may include text, numbers and/or symbols, and may be, by way of example, an LCD display, with or without lighting. Transmitter 1560 may be a radiofrequency transmitter that can transmit data, or may use another form of wireless transmission. Remote command device may be a handheld device contained in a housing convenient to hold in the hand, and having an internal source of power, such as a battery. Remote command device 1500 may also have an illumination source, such as a "white" LED, or an incandescent lamp with reflector, to provide illumination.

Figure 16A:
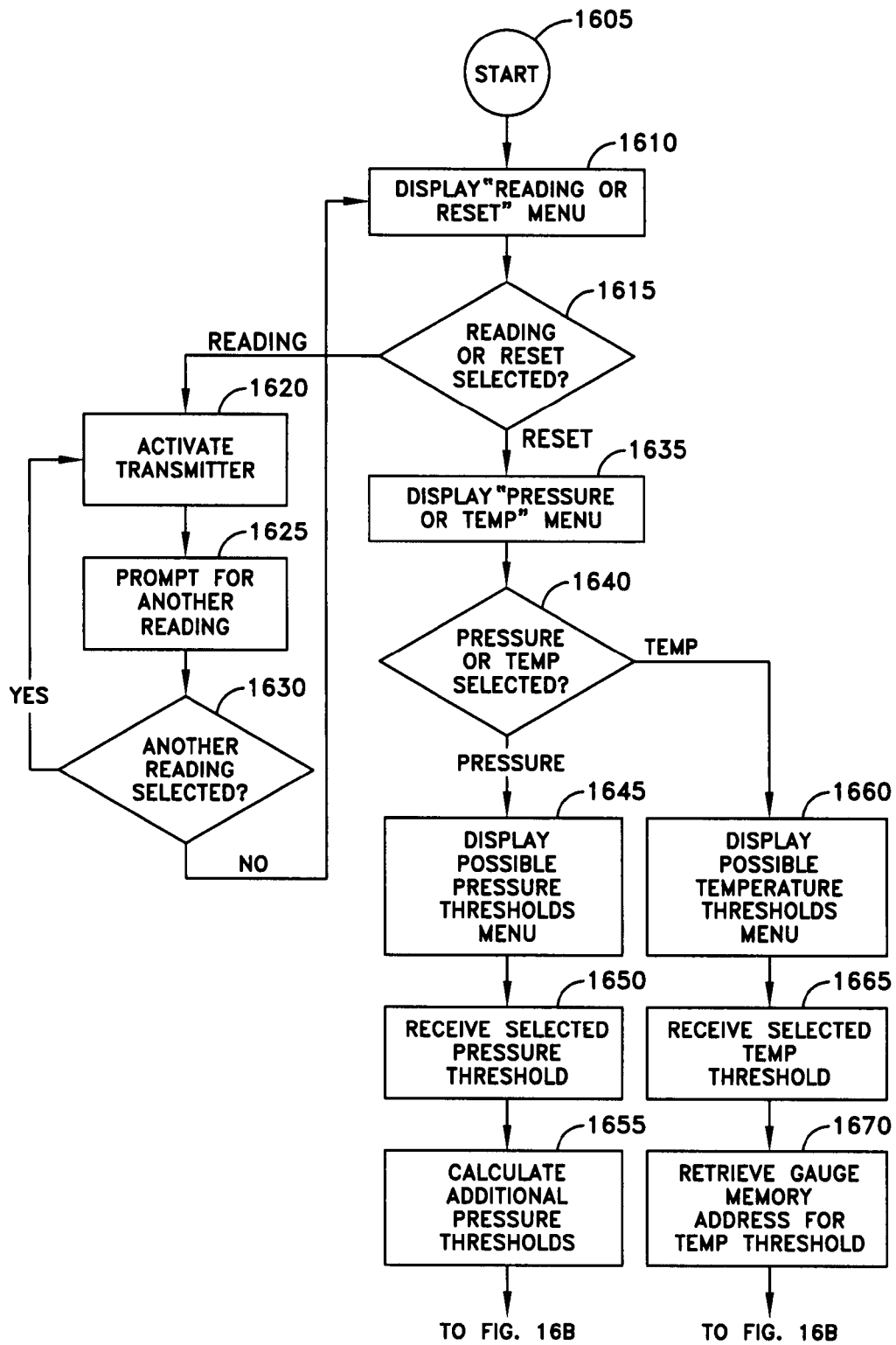
FIGS. 16A and 16B are a process flow diagram of a process performed by a remote control unit of FIG. 15.
Figure 16B:
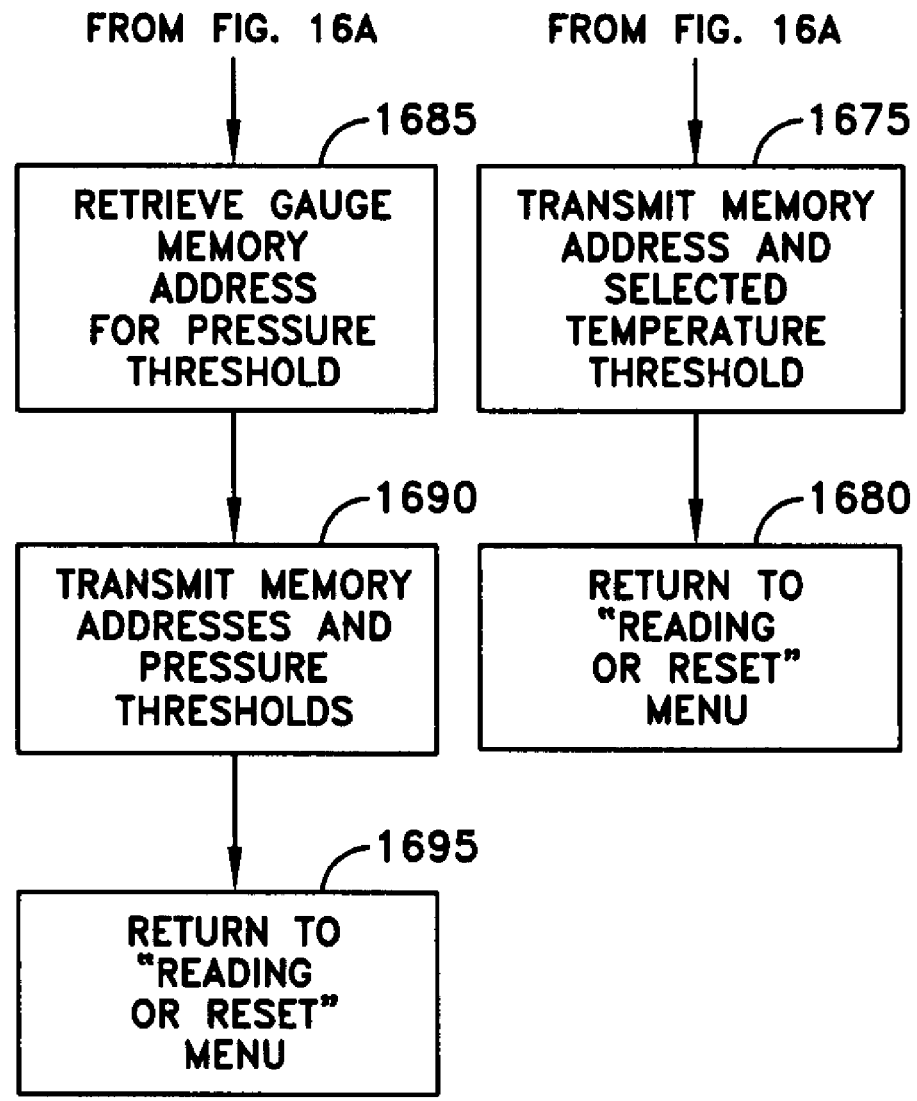

Referring now to FIGS. 16A and 16B, there is shown a process flow diagram of a method of operating the device of FIG. 15. Initially, after the user presses an on/off input, a wake signal may be sent to processor 1510, and processor 1510 enters an active state, as indicated generally by block 1605. Initially, as indicated by block 1610, processor 1510 may display a menu providing a user a choice of taking a reading, such as a temperature and/or pressure reading from a tire pressure gauge, or resetting thresholds. The user may select a choice, by initially moving up and down buttons to highlight a selection, or to position an indicator adjacent the selection, and then press the "select" button. As indicated by blocks 1615 and 1620, upon receiving a signal that a reading has been selected, processor 1510 activates transmitter 1560, which provides radiation and/or a signal to activate a tire pressure gauge and provide an output. After activating transmitter 1560, processor 1510 causes display 1550 to prompt the user for another reading, as indicated by block 1625. If a selection of another reading is received, then the process flow returns to activating the transmitter again, as indicated by block 1630. If no selection of another reading is made within a selected time, then the process flow may return to the reading or reset menu.

If "reset" has been selected, then, as indicated by block 1635, processor 1510 may cause a "pressure or temp" menu to be displayed, which enables a user to select changing thresholds for either pressure or temperature. If the user selects "pressure," then processor 1510 may cause a listing of possible recommended pressures to be displayed. The display may also include an instruction to the user to select the pressure recommended in an owners manual or on a placard on the vehicle. When the user selects one of the listed recommended pressures, the pressure is received by the processor, as indicated by block 1650. Additional pressure thresholds may then be calculated in accordance with an algorithm stored in memory 1520. By way of non-limiting example, the algorithm may call for the calculation of a pressure threshold five percent below the recommended threshold, and for calculation of a second pressure threshold ten percent below the recommended threshold. Processor 1510 must cause these new values to be stored in the appropriate memory locations, such as memory 1320 of FIG. 13. Processor 1510 may retrieve from memory 1520 the addresses of the locations in memory 1320 where these values are stored, as indicated by block 1685 of FIG. 16B. Processor 1510 then appropriately formats a message containing the memory addresses and values and causes transmitter 1560 to transmit the addresses and values, as indicated by block 1690. It will be appreciated that this transmission causes a processor in the gauge, such as processor 1310, to become activated, and to overwrite the existing pressure values in memory 1320 with the new memory values. It will be appreciated that the gauge includes a wireless receiver, such as an RF receiver and appropriate circuitry to enable accurate data reception. It will also be appreciated that the transmitted data may include, rather than memory addresses, an identification of the data, and that memory 1320 may include a lookup table to permit processor 1310 to identify proper memory locations for the new threshold values. It will also be appreciated that additional menus may be provided for users to select additional threshold values directly, rather than having those values calculated.

Once the process of transmission is complete, the process flow may return to display of the "reading or reset" menu, as indicated by block 1690.

A similar process flow may be followed if the user selects "temp" when the "pressure or temp" menu is selected. Referring to block 1660 on FIG. 16A, after processor 1510 receives a selection of "temp," processor 1510 may cause a listing of possible temperatures to be displayed. When the processor receives a user selection of one of the listed temperatures, as indicated by block 1665, processor 1510 may retrieve the memory address, in the memory of the gauge, for the threshold temperature, as indicated by block 1670. Processor 1510 then formats a message containing the memory address location and the new threshold temperature, and causes transmitter 1560 to transmit the message, as indicated by block 1675 of FIG. 16B. In the gauge, substantially the process described above with respect to receiving and storing new pressure thresholds is followed. After the step of transmission, processor 1510 may display the "reading or reset" menu again, as indicated by block 1680.

Figure 17:
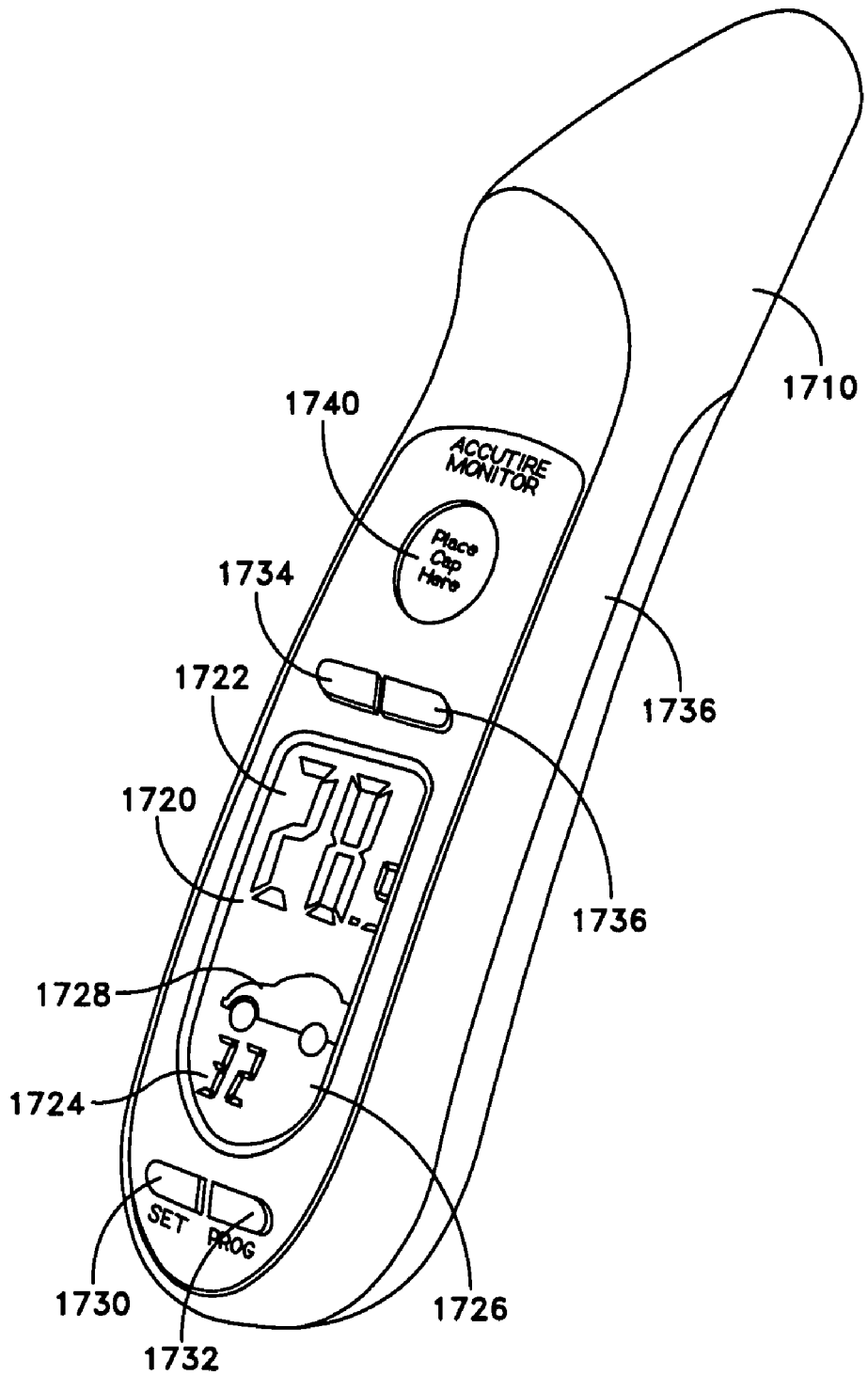
FIG. 17 is a view of an exemplary combined pressure gauge and programmer unit in accordance with an embodiment of the invention.

Referring now to FIG. 17, a programming unit 1700 in accordance with an embodiment of the invention will now be described. Programming unit 1700 has a housing 1710 suitable for holding in the hand of a user. Unit 1700 includes display 1720, which displays a detected tire pressure at 1722, a target tire pressure for front wheels of a vehicle at 1724, and a target tire pressure for rear wheels of a vehicle at 1726. A display of a vehicle at 1728 shows whether the rear or front wheel tire pressure values are being displayed.

Programming unit 1700 further includes user inputs. In the illustrated embodiment, there are four user inputs: SET button 1730, PROG button 1732, UP button 1734 and DOWN button 1736.

Programming unit 1700 further includes area 1740 designated by indicia for placement of valve-cap mountable gauges. Area 1740 is adjacent, for example, magnetic near field communication devices suitable for communicating with valve-cap mountable gauges. Indicia 1742 direct the user to place the valve-cap mountable gauge at area 1740.

Programming unit 1700 further includes a port for coupling with a tire valve, which port is not visible in the view of FIG. 17. Programming unit 1700 may optionally include a programmable tire pressure gauge, such as the programmable tire pressure gauge disclosed in U.S. patent application Ser. No. 11/051,650, filed Feb. 5, 2005, which application is incorporated by reference herein. The programmer unit may include a programmer unit port adapted to couple to a vehicle tire valve stem and to open a valve in the valve stem; a programmer unit chamber in physical communication with the programmer unit port; and a programmer unit pressure transducer in the programmer chamber for detecting a pressure of a fluid within the vehicle tire and providing an output signal representative of the detected pressure to the processor of the programmer unit. The processor may be adapted to cause the display to display a detected pressure in accordance with the output signal from the programmer unit pressure transducer.

Figure 18:
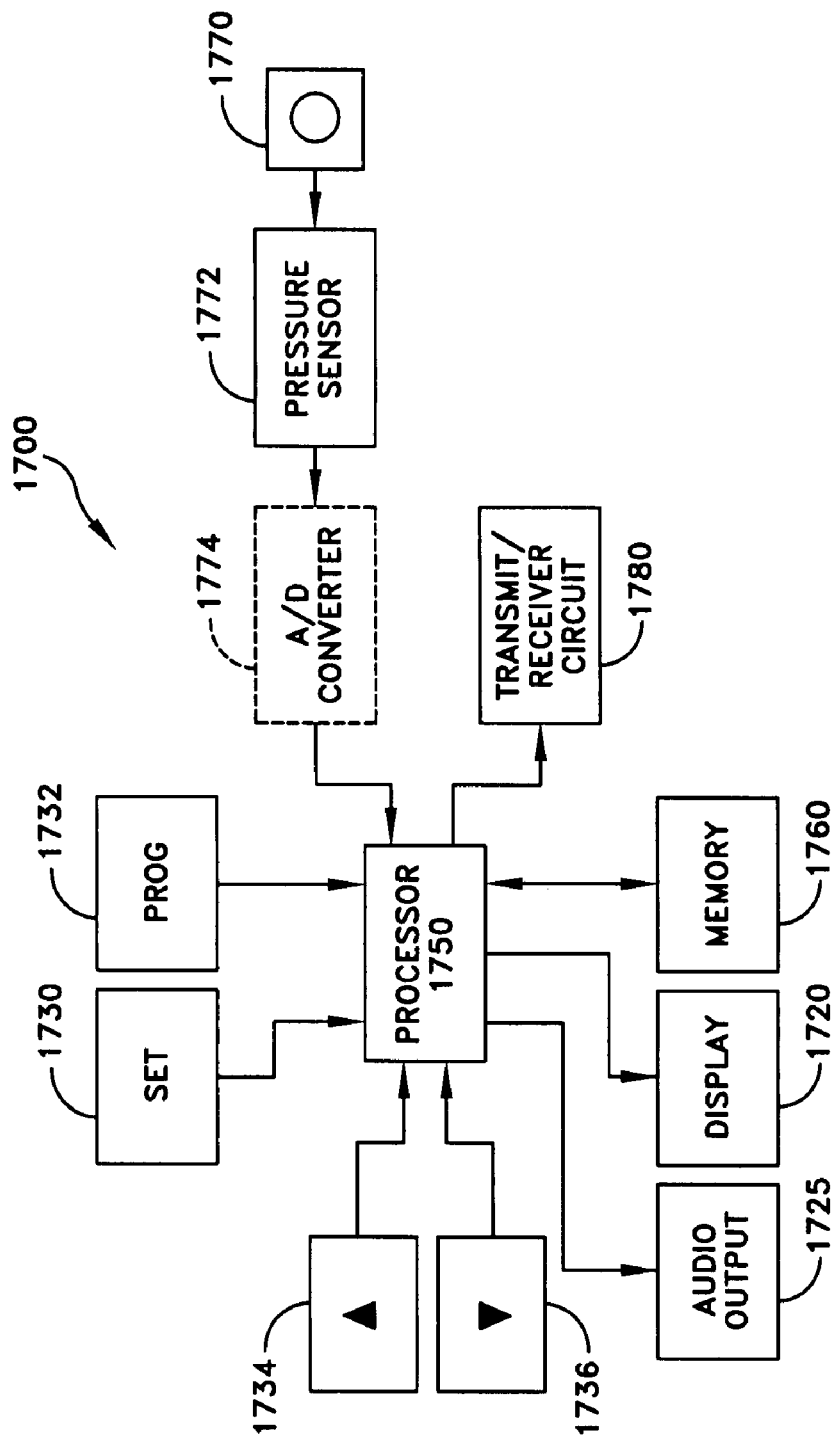
FIG. 18 is a block diagram of components of the combined pressure gauge and programmer unit of FIG. 17.

Referring now to FIG. 18, functional components of programming unit 1700 will now be described. Programming unit 1700 has processor 1750. Processor 1750 is operatively coupled to user inputs, including set button 1730, program button 1732, up button 1734, and down button 1736; display 1720; audio output 1725; memory 1760, a transmit receive circuit 1780, and via pressure sensor 1772 and option analog to digital converter 1774, pressure die 1770. Transmit receive circuit 1780 may include magnetic near field communication devices which may operate, by way of example, according to the ISO/IEC 18092 standard. Such devices may be located immediately below area 1740.

Figure 19A:
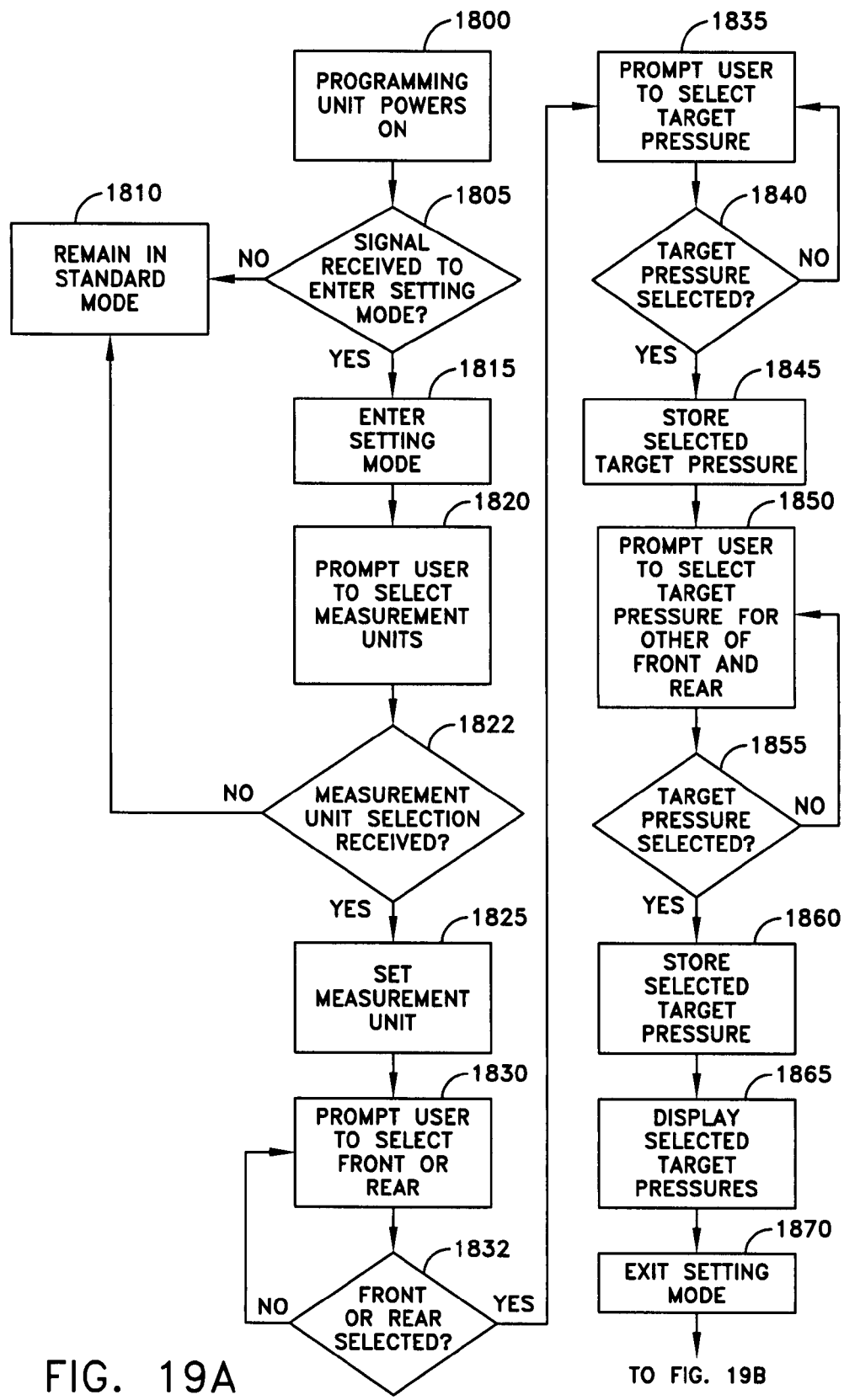
FIGS. 19A and 19B are a process flow diagram showing a process executed by the combined pressure gauge and programmer unit of FIG. 17.
Figure 19B:
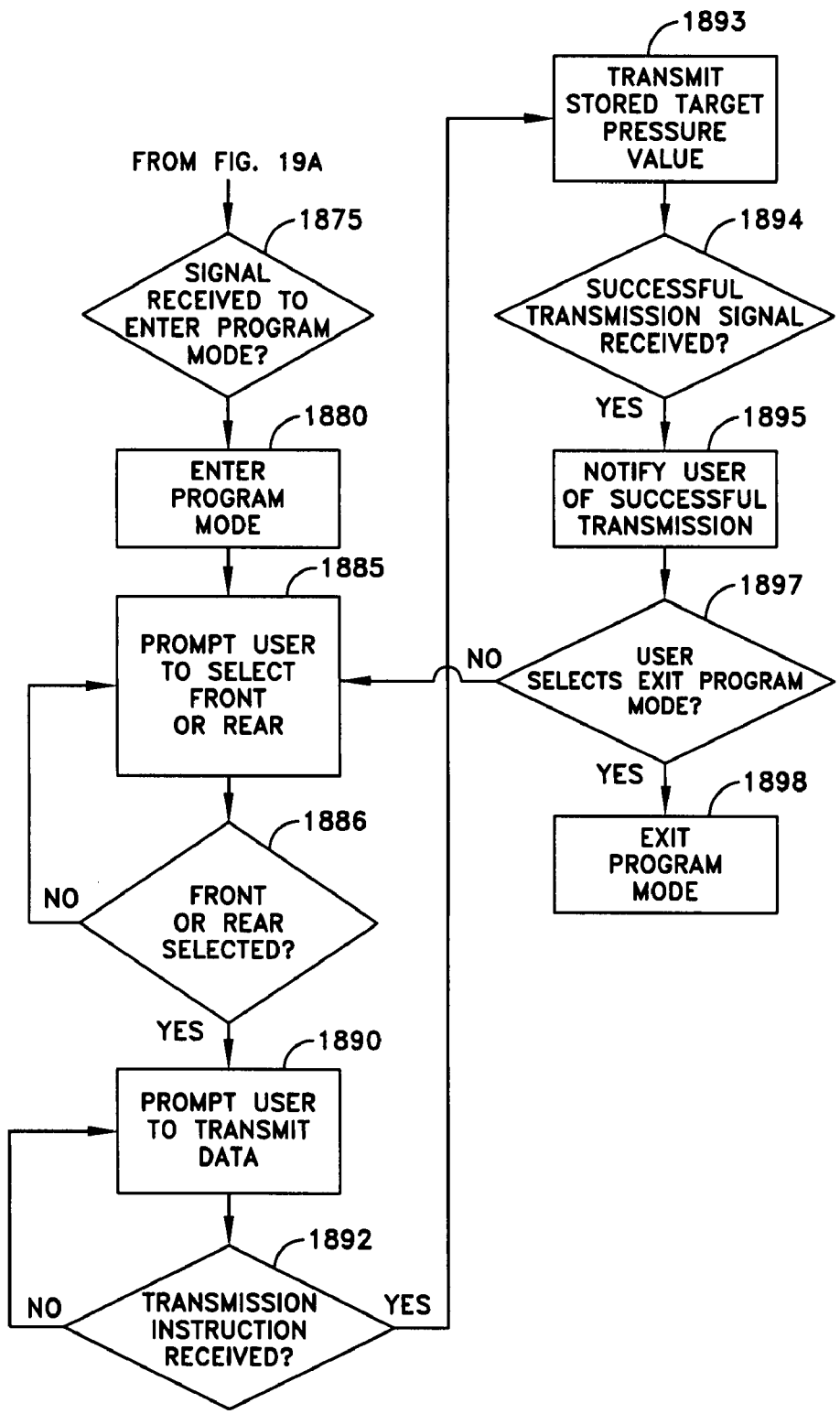

Referring now to FIG. 19A, which is a process flow diagram, a process of operating programming unit 1700 will now be described. In an initial step, indicated by block 1800, programming unit 1700 is powered on, such as by pressing of SET button 1730. The processor then looks to see if a user input has been received to enter the setting mode, as indicated by block 1805. If no such user input has been received, the programming unit remains in a standard mode, which permits testing of pressure without comparison to a preset value, as indicated by block 1810. If the user input to enter the setting mode has been received, then the processor enters the setting mode, as indicated by block 1815. The processor then causes the display to prompt the user to select measurement units, such as by causing a display of unit type, such as PSI or BAR, to flash on display 1720, as indicated by block 1820. If a user selection is received, such as by the user employing buttons 1734, 1736 to toggle between or among measurement units, and then pressing SET button 1730, then a measurement unit is selected, as indicated by blocks 1822 and 1825. If no selection is received, then the unit returns to a dormant mode.

Processor 1750 then causes display 1720 to prompt a user to select either front or rear tires, as indicated by block 1830. If the front or rear tires are selected, such as by the user toggling between front and rear by using up and down buttons 1734, 1735, and then pressing SET button 1730, then the processor causes display 1720 to prompt the user to select a target tire pressure value, as indicted by blocks 1832 and 1835. If no selection is made, then the prompting step continues. The user may be prompted by causing the display to flash a predetermined tire pressure value. The user may change the displayed tire pressure value by pressing UP button 1734 and DOWN button 1736, and may select a tire pressure value by pressing SET button 1730. Upon receipt of a selected tire pressure value, processor 1750 causes the selected tire pressure value to be stored at an appropriate location in memory 1760, as indicated by blocks 1840, 1845. Processor 1750 then causes display 1720 to prompt the user to enter a target tire pressure value for the other of the front and rear tires, in a similar manner as above, as indicated by block 1850. If a target tire pressure is selected, then processor 1750 causes the target tire pressure to be stored in memory 1760, as indicated by blocks 1855, 1860. The processor then causes display 1750 to display the stored target tire pressure values, and then exits setting mode, as indicated by blocks 1865, 1870.

If processor 1750 receives a user input directing entry into a program mode, as indicated by block 1875, such as by the user pressing PROG button 1732, then the processor 1750 enters program mode, as indicated by block 1880. The processor causes display 1720 to prompt a user to select either rear or front tires, such as by displaying front or rear tire flashing, as indicated by block 1885. The processor looks for a user selection, such as by toggling using UP and DOWN buttons 1734, 1736, and then selecting rear or front by pressing the SET button. If the user has selected front or rear tires, then the user is prompted to transmit data, as indicated by block 1886, 1890. The user is to place a pressure gauge, such as pressure gauge 2000 shown in FIG. 20, on programming unit 1700. The processor then looks to see if the user has indicated that programming information is to be transmitted, such as by pressing the PROG button, as indicated by block 1892. If so, the processor causes the transmitter to transmit programming information for the selected one of rear or front tires, as indicated by block 1893.

In some embodiments, the gauge transmits a signal indicating successful receipt of programming information. If the processor detects a signal indicating successful transmission, the processor may cause a user notification to occur, as indicated by blocks 1894, 1895. By way of example, the user notification may be a tone emitted by the audio interface. If no signal indicating successful transmission is received, in some embodiments, the display may show an error message, or no message may be shown. If the user selects exiting program mode, such as by pressing the PROG button, then the programming unit exits program mode, as indicated by blocks 1897, 1898.

Figure 20:
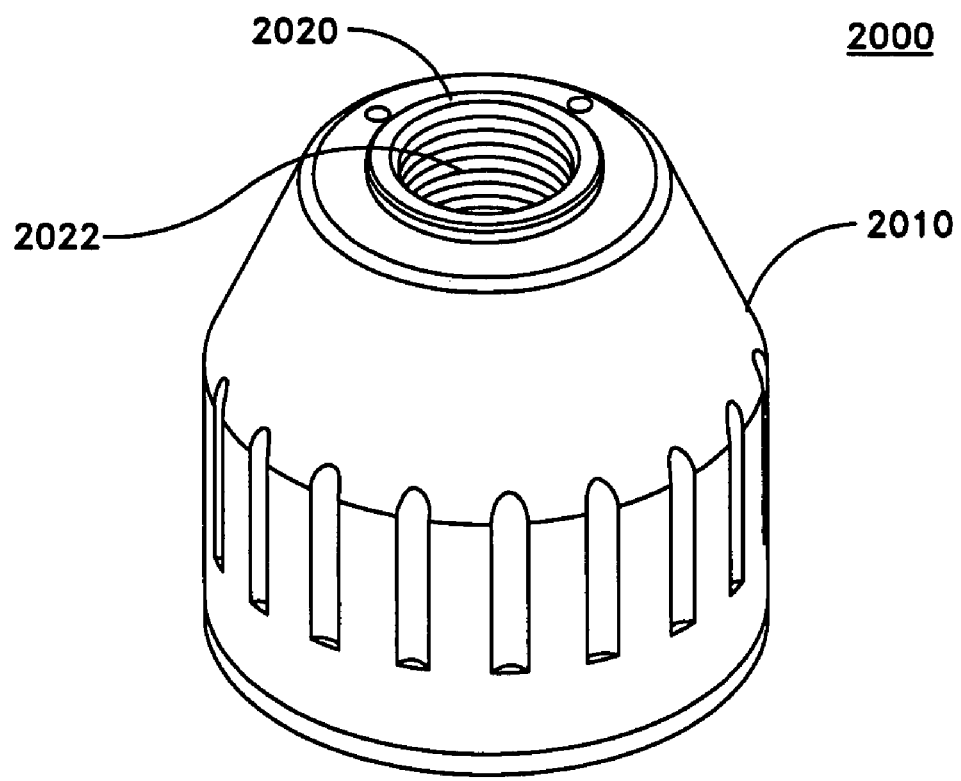
FIG. 20 is a view of a tire pressure gauge according to an embodiment of the invention.

Referring now to FIG. 20, an embodiment of a tire pressure gauge for use with programming unit 1700 will now be described. Gauge 2000 has housing 2010, with port 2020 defined therein. Port 2020 has an internally threaded bore 2022 visible therein. Port 2020 is adapted to couple to and to threadingly engage a valve stem, so as to be removably mounted thereon. Port 2020 also includes a needle adapted to open a needle valve in a valve stem. Housing 2010 is transparent or translucent to permit a user to view activated light emitting elements, such as LEDs, therein. Housing 2010 may be of ABS or other suitable material. Housing 2010 may be electrically insulating, and in particular not of metal, as electrically conducting material would degrade magnetic signals transmitted by programming unit 1700.

Figure 21:
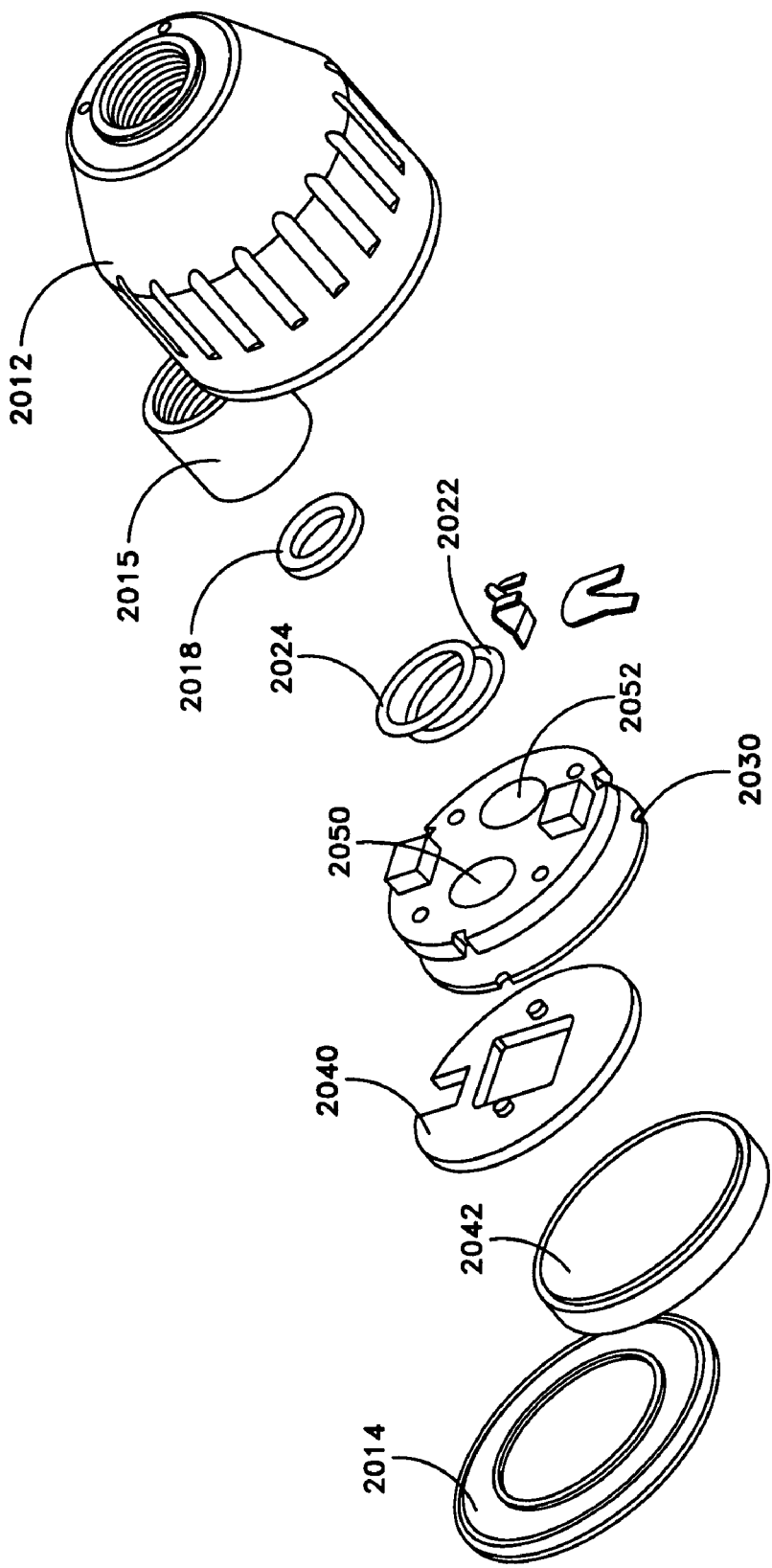
FIG. 21 is an exploded view of the tire pressure gauge of FIG. 20.
Figure 22:
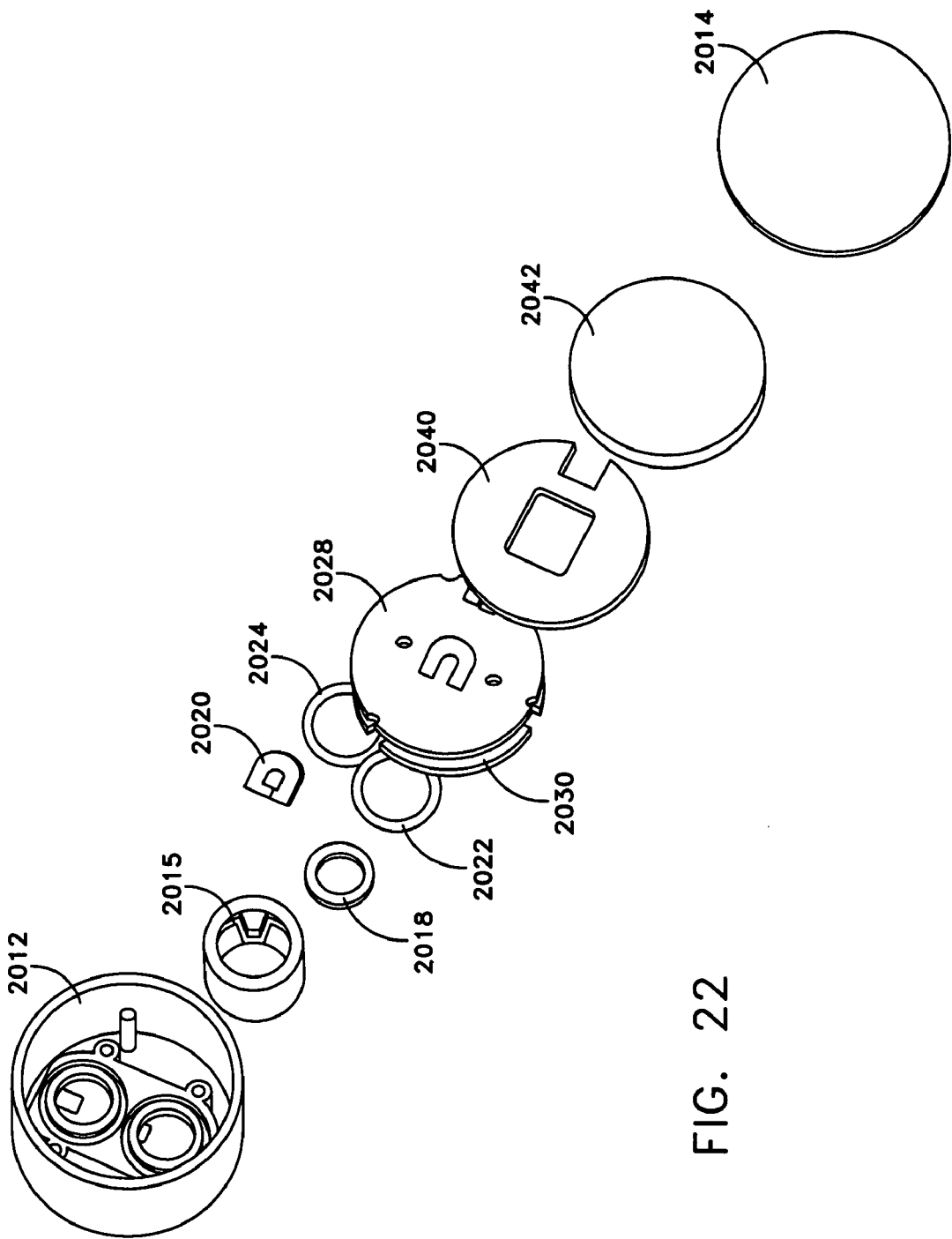
FIG. 22 is an exploded view from a different perspective of the tire pressure gauge of FIG. 20.
Figure 23:
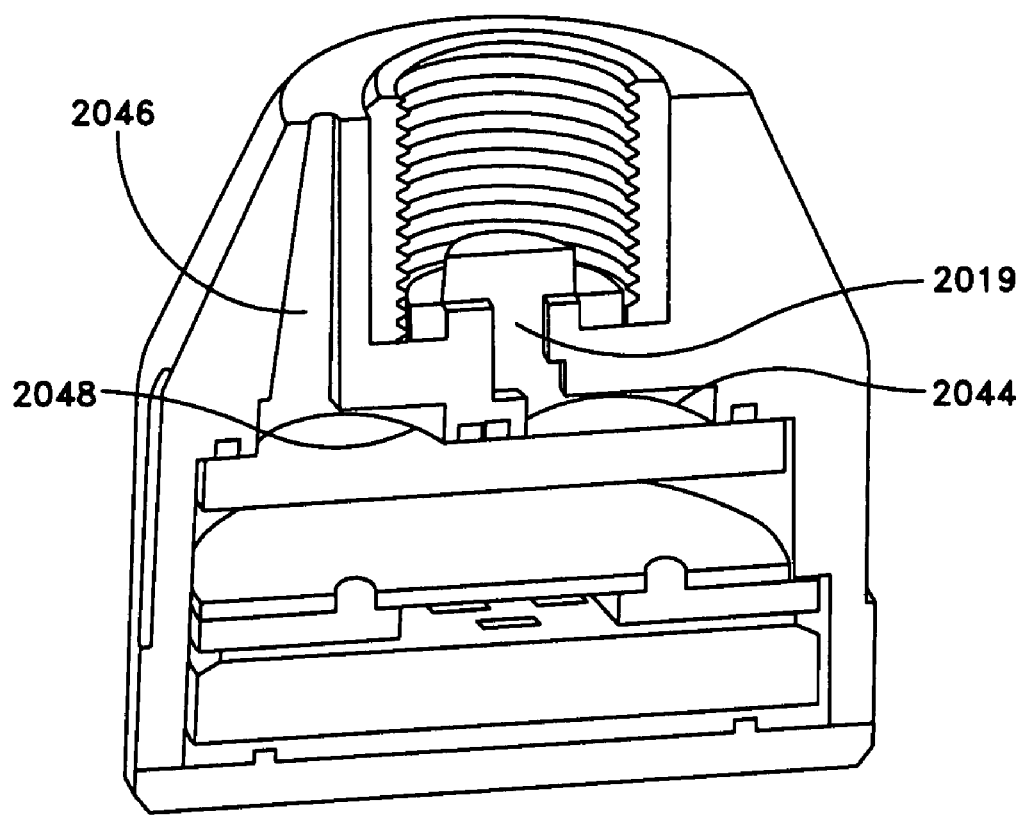
FIG. 23 is a sectional view of the tire pressure gauge of FIG. 20.

Referring now to FIGS. 21 and 22, exploded views of tire pressure gauge 2000 are shown, and a section is shown in FIG. 23. Housing 2010 includes main shell 2012 and cap 2014, which together provide a substantially water tight housing having having a port and a vent. Main shell 2012 includes a cylindrical bore which accommodates internally threaded sleeve 2015. Main O-ring 2018 provides a seal between a valve stem and internally threaded sleeve 2015. First printed circuit board 2030 has first pressure die 2050 and second pressure die 2052 thereon. First pressure die 2050 is in first chamber 2044, which communicates with port 2020 via passage 2019. First chamber 2044 is thus maintained at the pressure of the interior of a tire when port 2020 is coupled to a valve stem of the tire. Second pressure die 2052 is in second chamber 2048, which is coupled via passage 2046 to vent 2047, so that pressure die 2052 is maintained at ambient pressure and temperature. O-rings 2022, 2024 seal chambers 2046, 2048 from one another and from the remainder of the interior of housing 2010.

Various electronic devices, including a processor and one or more illuminating devices, such as LEDs, are mounted on circuit boards 2030, 2028. Plate 2040 serves as a support for battery 2042. Contacts are provided to furnish power from battery 2042 to boards 2028, 2030.

Figure 24:
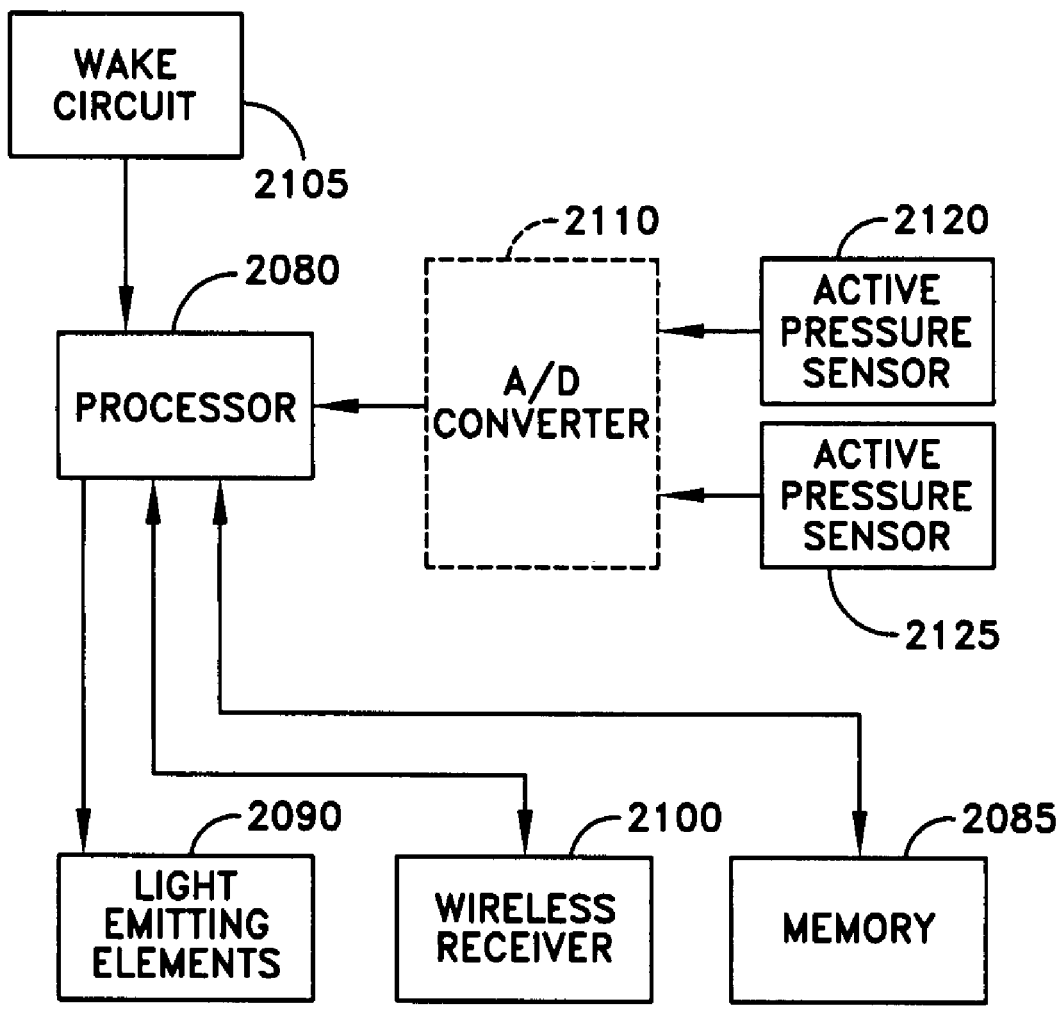
FIG. 24 is a block diagram of components of the tire pressure gauge of FIG. 20.

Referring now to FIG. 24, functional components of gauge 2000 will now be described. Processor 2080 is operatively coupled to memory 2085, wireless receiver 2100, light emitting elements 2090, wake circuit 2105, and via optional multichannel A/D converter 2110, active pressure sensor 2120 and reference pressure sensor 2125. Processor 2080 is both operatively and physically coupled to each of these components. As the processor is physically coupled, the processor communicates with these components via electrical signals transmitted via conductive connectors, such as metal wires, busses, conductive plating on printed circuit boards, vias filled with conductors, and the like, and not by wireless transmission, whether radiofrequency, infrared, ultrasonic, or other form of wireless transmission. Light emitting elements 2090 may be one, two, or more multi-color LEDs. In some embodiments, each light emitting element may be a multi-color LED capable of illumination in at least four colors. Wireless receiver 2100 may be a magnetic near field communication device, adapted to receive signals from transmitter 1780 of programming unit 1700. Wake circuit 2105 may be adapted to be responsive to a sufficiently powerful magnetic field, so that by bringing the permanent magnet of programming unit 1700 in sufficiently close proximity to gauge 2000, wake circuit 2105 is activated.

Figure 25:
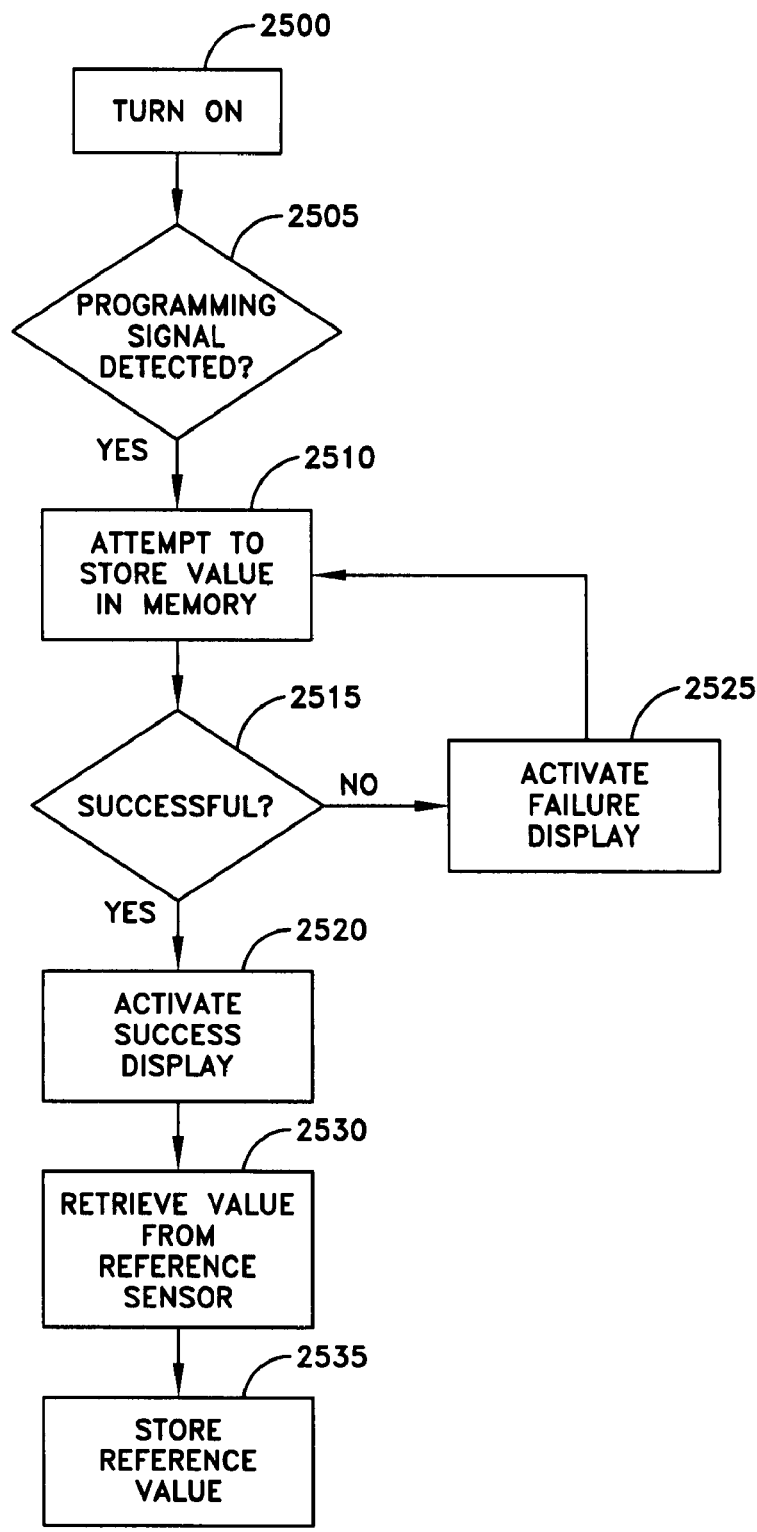
FIG. 25 is a process flow diagram of a process flow in a programming process executed by a tire pressure gauge of FIG. 20.

Referring now to FIG. 25, a process flow of steps associated with programming of gauge 2000 will now be described. In a step indicated by block 2500, the processor 2080 wakes up, such as in response to a signal from wake circuit 2105. In a next step, indicated by block 2505, processor 2080 checks to see if a programming signal has been detected. A programming signal would be received by wireless receiver 2100. If a programming signal is detected, then processor 2080 attempts to store a value in memory, as indicated by block 2510. This step may include checks of the integrity of the data received. Processor 2080 may store a target pressure value, or may, by way of example, calculate one or more threshold values, and store those threshold values in memory. By way of example, the threshold values of 80 percent of target, 90 percent of target, and 120 percent of target, may be calculated and stored in memory. The threshold values may be calculated either by the processor 2080, in which case the target pressure value is transmitted, or by processor 1750 in the hand held unit, in which case the threshold values are transmitted.

If the step of storing was successful, processor 2080 causes light emitting elements 2090 to activate in a display indicating success, as indicated by blocks 2515 and 2520. By way of example, light emitting elements 2090 may illuminate green, either continuously for a period of time, or in a selected number of flashes of selected duration. In some embodiments, processor 2080 may also or alternatively cause an optional transmitter to transmit a signal indicating successful storing of values.

If the step of storing was not successful, such as because the received signal failed a data integrity check, then processor 2080 causes light emitting elements 2090 to activate in a display indicating failure, as indicated by block 2525. By way of example, light emitting elements 2090 may illuminate red, either continuously for a period of time, or in a selected number of flashes of selected duration. In some embodiments, processor 2080 may also or alternatively cause an optional transmitter to transmit a signal indicating failure to store values. The processor then continues to look for a programming signal.

If the step of storing is successful, then the processor may continue by receiving a detected value from the reference sensor 2125, as indicated by block 2530. The reference value is then stored in memory as a reference zero pressure value, as indicated by block 2535. Processor 2080 powers down if no further programming signal is detected after a selected period of time.

Figure 26:
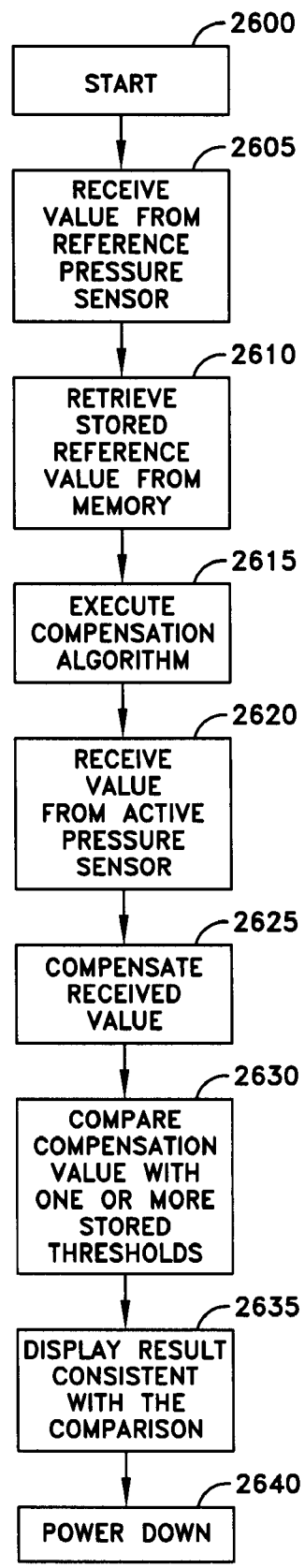
FIG. 26 is a process flow diagram of a process flow in a pressure measurement process executed by a tire pressure gauge of FIG. 20.

Referring now to FIG. 26, a process flow of steps taken when detecting and displaying a pressure value will be discussed. As indicated by block 2600, processor wakes up, such as in response to a signal from wake circuit 2105. Processor 2080 may optionally first check for a programming signal. Processor 2080 then receives a detected value from reference pressure sensor 2125, as indicated by block 2605. Processor 2080 then retrieves the stored reference pressure value from memory, as indicated by block 2610. Processor 2080 then executes a compensation algorithm, using the stored and current values from the reference pressure sensor, to obtain and store a factor for compensating the reading from the active pressure sensor, as indicated by block 2615. Such a compensation step is desirable to correct for changes in response due to temperature changes, for example. As the active pressure sensor is typically maintained at tire pressure continuously, it is not possible to check the zero pressure response of the active sensor, in contrast to handheld digital pressure gauges.

The processor then receives the value from active pressure sensor 2120, as indicated by block 2620. The processor then compensates the received value, using the stored result of the step of executing the compensation algorithm, as indicated by block 2625. The compensated value is then compared to one or more stored thresholds, as indicated by block 2630. By way of example, the compensated value may be compared to stored thresholds representing 80%, 90% and 120% of a programmed target value. Based on the result of the comparison, the processor causes light emitting elements to display an output consistent with the result of the comparison, as indicated by block 2635. By way of example, a comparison result between 90% and 120% of the target pressure may result in a display indicating proper pressurization, such as a green display by a multi-color LED. A comparison result between 80% and 90% of the target pressure may result in a display indicating under pressurization, such as a yellow display by a multi-color LED. A comparison result below 80% of the target pressure may result in a display indicating substantial underpressurization, such as a red display by a multi-color LED. A comparison result above 120% of the target pressure may result in a display indicating overpressurization, such as a blue display by a multi-color LED.

In some embodiments, the processor may cause a transmitter to output a signal indicating either a threshold reading, or the compensated pressure reading for display.

After providing the display, and the optional step of transmission, the processor powers down, as indicated by block 2640.

Substantially as explained above, in some embodiments, the valve-cap mountable gauge may include a transmitter, and a corresponding receiver may be provided in the command unit. The processor of the valve-cap mountable gauge may be adapted to cause the transmitter to transmit a signal indicative that a signal has been received and acted upon. For example, signals may be transmitted to indicate one or more of: that the processor of the valve-cap mountable gauge is active; and that a value has been stored in a memory location. Particular values may also be transmitted, such as threshold values stored in a memory location, or pressure readings. The processor in the command unit may be programmed for actions dependent on the signal received from the valve-cap mounted gauge. For example, the processor in the command unit may cause a signal to be retransmitted if no response or an improper response is received. By way of further example, the processor in the command unit may be programmed to display an error message to a user (such as on a display) if no response or an improper response is received. By way of example, if a response is received indicating that a value has been stored in memory, the processor of the command unit may be programmed to cause the display to display a message indicating successful programming of the valve cap mounted pressure gauge. By way of further example, the processor in the command unit may be programmed to display a pressure value received from the valve-cap mounted gauge.

It will be appreciated that each of the ports for coupling to and mounting to a valve stem of a vehicle tire may be adapted to mount on a valve stem by virtue of having interior threads which permits them to be screwed or threaded onto a valve stem. It will be appreciated that alternative structures may be included in the port for providing that the port is adapted to mount on a valve stem. The ports for coupling to and mounting on a valve stem may be adapted to couple to and mount on a valve stem with no modification to the valve stem.

Advantages of a device and method in accordance with the invention include permitting the user to determine whether a tire is underpressurized without the need to remove a tire valve stem cap and physically engage a tire pressure gauge with the tire valve stem cap, or to use a radiofrequency system. A further advantage is that a device in accordance with an embodiment of the invention is that such devices may be installed on vehicles with minimal effort and cost associated with installation. A further advantage of a device in accordance with some embodiments of the invention is that the user may provide the recommended tire pressure of the user's own vehicle to the device, thereby avoiding the need to have this pressure pre-stored when the device is manufactured. An advantage of the use of multi-color LEDs as a display in connection with a device or method in accordance with the invention is that multi-color LEDs provide an output in one of a plurality of colors with less space than multiple LEDs and fewer electrical connections than multiple LEDs. An advantage of an embodiment having both an active pressure sensor and a reference pressure sensor is that readings will be compensated for variations in temperature, for example, while the gauge remains on the valve stem. Additional advantages of embodiments of the invention will be evident to those of skill in the art.

The foregoing description of the embodiments of this invention has been presented for purposes of illustration and description. It is not intended to be exhaustive or to limit the invention to the forms explicitly disclosed, as many modifications and variations are possible without departing from the scope and spirit of the present invention. It will also be appreciated that features, components, processes and process steps from various embodiments disclosed above may be incorporated in others of the embodiments disclosed above. By way of example, the multiple sensor die disclosed in FIG. 12 may be incorporated in any of the disclosed embodiments.

As an example, the device's exterior appearance may be modified and the accompanying processing steps, electronic components or circuitry may also be changed. As a further example, while the display is positioned on the top outer surface of the device housing in the embodiment of FIG. 1, the display may be positioned elsewhere on the exterior surface of the device, or may be positioned within the outer housing and visible through a transparent or translucent portion of the outer housing; alternatively, the entire outer housing may be translucent or transparent. The examples of displays are not limiting. By way of example the display may be or include a liquid crystal display, with or without a source of illumination. These and such other modifications and variations that may be apparent to a person skilled in the art are intended to be included within the scope of this invention.

What is claimed is:

1. A tire pressure gauge, comprising:
   a housing;
   a port fixed on the housing, and adapted to couple to and having a bore having a threaded interior surface to sealingly engage with and be mounted on a threaded vehicle tire valve stem and to open a valve in the valve stem;
   a chamber in the housing and in physical communication with said port;
   a pressure transducer in said chamber for detecting a pressure of a fluid within the vehicle tire and providing an output signal representative of the detected pressure;
   a processor in the housing, and physically coupled to said pressure transducer for receiving said output signal, and for providing a processor output signal indicative of a value of the detected pressure;
   a wake circuit in the housing for receiving a wireless wake signal and being physically coupled to the processor for providing a signal causing the processor to change from a powered down state to an activated state; and
   a display on the housing and physically coupled to said processor for providing a visible indication of detected pressure value in accordance with the processor output signal.

2. The tire pressure gauge of claim 1, wherein said display is adapted to illuminate in one of a plurality of colors dependent on the processor output signal.

3. The tire pressure gauge of claim 2, wherein said display comprises a light emitting diode.

4. The tire pressure gauge of claim 3, wherein said light emitting diode is a multi-color light emitting diode capable of emitting in at least three colors.

5. A tire pressure gauge, comprising:
   a housing;
   a port fixed on the housing and adapted to couple to and having a bore having a threaded interior surface to sealingly engage with and be mounted on a vehicle tire valve stem and to open a valve in the valve stem;
   a chamber in the housing and in physical communication with said port;
   a pressure transducer in said chamber for detecting a pressure of a fluid within the vehicle tire and providing an output signal representative of the detected pressure;
   a processor in the housing and physically coupled to said pressure transducer for receiving said output signal, and for providing a processor output signal indicative of a value of the detected pressure;
   a memory for storing a parameter;
   a wireless receiver;
   a display on the housing and physically coupled to said processor for providing a visible indication of detected pressure value in accordance with the processor output signal;
   wherein the processor is adapted to cause a value of the parameter received by said receiver to be stored by said memory, and wherein said processor is adapted to determine said processor output signal based on said parameter and said detected pressure.

6. The tire pressure gauge of claim 5, wherein said processor output signal is based on a comparison of said detected pressure and said parameter.

7. The tire pressure gauge of claim 5, wherein said display is adapted to illuminate in one of a plurality of colors dependent on the processor output signal.

8. The tire pressure gauge of claim 7, wherein said display comprises a light emitting diode.

9. The tire pressure gauge of claim 8, wherein said light emitting diode is a multi-color light emitting diode capable of emitting in at least three colors.

10. A tire pressure gauge, comprising:
    a port adapted to couple to and be mounted on a vehicle tire valve stem and to open a valve in the valve stem;
    a chamber in physical communication with said port;
    an active pressure transducer in said chamber for detecting a pressure of a fluid within the vehicle tire and providing an output signal representative of the detected tire pressure;
    a reference transducer at ambient pressure for detecting ambient air pressure and providing an output signal representative of the detected ambient pressure;
    a processor physically coupled to said active pressure transducer and said reference transducer for receiving said output signals, and for retrieving a stored ambient pressure value from memory; executing a compensation algorithm based on said stored ambient pressure value and said detected ambient pressure; compensating said detected tire pressure based on the result of the compensation algorithm; providing an output signal indicative of a value of the compensated detected tire pressure; and
    a display physically coupled to said processor for providing a visible indication of the compensated detected tire pressure value in accordance with the processor output signal.

11. The tire pressure gauge of claim 10, further comprising a housing, and wherein said port, said transducer, said processor, and said display are fixed with respect to said housing.

12. The tire pressure gauge of claim 11, wherein said port, said transducer, said processor, and said display are interior to said housing.

13. The tire pressure gauge of claim 10, wherein said display is adapted to illuminate in one of a plurality of colors dependent on the processor output signal.

14. The tire pressure gauge of claim 13, wherein said display comprises a light emitting diode.

15. The tire pressure gauge of claim 14, wherein said light emitting diode is a multi-color light emitting diode capable of emitting in at least three colors.

16. The tire pressure gauge of claim 10, wherein said port comprises a bore having an threaded interior surface.

17. A system for monitoring tire pressure, comprising:
    a tire pressure gauge, comprising:

a port adapted to couple to and be mounted on a vehicle tire valve stem and to open a valve in the valve stem;

a chamber in physical communication with said port;

a pressure transducer in said chamber for detecting a pressure of a fluid within the vehicle tire and providing an output signal representative of the detected pressure;

a processor physically coupled to said pressure transducer for receiving said output signal, and for providing a processor output signal indicative of a value of the detected pressure;

a display physically coupled to said processor for providing a visible indication of detected pressure value in accordance with the processor output signal;

a receiver for receiving a wirelessly transmitted signal indicating a pressure threshold value; and a memory for storing said pressure threshold value;

wherein the processor is adapted to determine said processor output signal based on said threshold value and said detected pressure;

a programmer unit having user inputs, a transmitter for transmitting a wireless signal capable of being received by said receiver, and a programmer unit processor, said processor being adapted to cause a threshold pressure value received at said user inputs to be transmitted by said transmitter.

18. The system of claim 17, wherein said programmer unit further comprises a display adapted to display at least said received threshold pressure value.

19. The system of claim 17, wherein said tire pressure gauge further comprises a wake circuit for activating said processor, and said programmer unit comprises a wireless emitter for emitting a signal adapted to activate said wake circuit.

20. The system of claim 19, wherein said wireless emitter comprises a permanent magnet.

21. The system of claim 17, wherein said programmer unit further comprises:

a programmer unit port adapted to couple to a vehicle tire valve stem and to open a valve in the valve stem;

a programmer unit chamber in physical communication with said programmer unit port;

a programmer unit pressure transducer in said programmer chamber for detecting a pressure of a fluid within the vehicle tire and providing an output signal representative of the detected pressure;

said display being adapted to display a detected pressure in accordance with said output signal from said programmer unit pressure transducer.

22. The system of claim 17, wherein said tire pressure gauge processor is adapted to cause said display to indicate receipt of a signal from said programmer unit.

23. A method for displaying an indication relating to the fluid pressure within a vehicle tire having a valve stem, comprising the steps of:

receiving at a wake circuit a wireless wake signal;

receiving from said wake circuit an activation signal;

receiving via a wired connection from an active pressure transducer in a chamber, the chamber being in physical communication with a port adapted to couple to and be mounted on the valve stem and to open a valve in the valve stem, an output signal representative of pressure in the tire; and outputting a signal via a wired connection to a display to cause the display to provide a visible indication of the detected pressure.

24. A method of providing an indication relating to the fluid pressure within a vehicle tire having a valve stem, comprising the steps of:

receiving via wireless communication information related to fluid pressure;

storing in memory a parameter based on the received information;

receiving via a wired connection from an active pressure transducer in a chamber, the chamber being in physical communication with a port adapted to couple to and be mounted on the valve stem and to open a valve in the valve stem, an output signal representative of detected pressure in the tire;

retrieving the stored parameter from memory;

determining, based on the parameter and the signal representative of pressure in the tire, a processor output signal, and providing the processor output signal via a wired connection to a display, the processor output signal causing the display to provide a visible indication of the detected pressure.

25. A method of providing an indication relating to the fluid pressure within a vehicle tire having a valve stem, comprising the steps of:

receiving via a wired connection from an active pressure transducer in a chamber, the chamber being in physical communication with a port adapted to couple to and be mounted on the valve stem and to open a valve in the valve stem, an output signal representative of detected pressure in the tire;

receiving via a wired connection from a reference pressure transducer at ambient pressure and temperature, an output signal representative of a detected ambient pressure;

retrieving a stored reference pressure from memory;

executing a compensation algorithm based on said stored reference pressure and said detected ambient pressure;

compensating said detected tire pressure based on the result of the compensation algorithm to obtain a compensated detected tire pressure value; and providing an output signal indicative of a value of the compensated detected tire pressure to cause a display physically coupled to said processor to provide a visible indication of the compensated detected tire pressure value.

* * * * *